(12) United States Patent
Onogi et al.

(10) Patent No.: US 11,907,020 B2
(45) Date of Patent: Feb. 20, 2024

(54) DISPLAY DEVICE

(71) Applicant: KOJIMA INDUSTRIES CORPORATION, Aichi (JP)

(72) Inventors: Fumihiro Onogi, Toyota (JP); Takahiro Suzuki, Toyota (JP); Yasuyuki Andou, Toyota (JP); Norifumi Suzuki, Toyota (JP)

(73) Assignee: KOJIMA INDUSTRIES CORPORATION, Aichi (JP)

( * ) Notice: Subject to any disclaimer, the term of this patent is extended or adjusted under 35 U.S.C. 154(b) by 0 days.

(21) Appl. No.: 18/069,891

(22) Filed: Dec. 21, 2022

(65) Prior Publication Data
US 2023/0131157 A1    Apr. 27, 2023

Related U.S. Application Data

(63) Continuation of application No. PCT/JP2021/023878, filed on Jun. 23, 2021.

(30) Foreign Application Priority Data

Jun. 26, 2020 (JP) ................................ 2020-110951

(51) Int. Cl.
*G09G 5/00* (2006.01)
*G06F 1/16* (2006.01)
*B60K 37/02* (2006.01)
*G09F 9/30* (2006.01)

(52) U.S. Cl.
CPC ............ *G06F 1/1652* (2013.01); *B60K 37/02* (2013.01); *G06F 1/1624* (2013.01); *G09F 9/301* (2013.01); *B60K 2370/1533* (2019.05); *B60K 2370/52* (2019.05); *B60K 2370/67* (2019.05)

(58) Field of Classification Search
CPC ... G09F 9/00; G09F 9/30; G09F 9/301; G06F 1/1624; G06F 1/1652; G09G 5/03; G09G 5/035; G09G 2380/02; B60K 37/02; B60K 2370/52; B60K 2370/67; B60K 2370/1533
See application file for complete search history.

(56) References Cited

U.S. PATENT DOCUMENTS

| | | | |
|---|---|---|---|
| 6,256,078 B1 * | 7/2001 | Ogata | ................ B64D 11/0015 349/58 |
| 10,086,762 B2 | 10/2018 | Uhm | |
| 11,511,681 B2 * | 11/2022 | Bruegl | ................ B60R 11/0235 |

(Continued)

FOREIGN PATENT DOCUMENTS

| | | |
|---|---|---|
| CN | 209972343 U | 1/2020 |
| CN | 210478553 U | 5/2020 |

(Continued)

*Primary Examiner* — Joe H Cheng
(74) *Attorney, Agent, or Firm* — HAUPTMAN HAM, LLP

(57) ABSTRACT

Provided is a display device provided inside a vehicle. The display device includes: a display having flexibility and a sheet shape; a movement mechanism that includes a connection connected to a first end portion of the display and in which the connection moves in a direction intersecting a front-rear direction of the vehicle; and a guide mechanism configured to guide a second end portion of the display in a guide direction different from a movement direction of the connection in association with movement of the connection while curving and supporting a part of the display.

12 Claims, 14 Drawing Sheets

(56) References Cited

U.S. PATENT DOCUMENTS

| | | | | |
|---|---|---|---|---|
| 2005/0013099 A1* | 1/2005 | Chou | ................... | G06F 1/1601 |
| | | | | 361/679.06 |
| 2009/0038422 A1* | 2/2009 | Choi | ................. | B60R 11/0235 |
| | | | | 74/89.17 |
| 2012/0268665 A1* | 10/2012 | Yetukuri | ................ | B60N 2/879 |
| | | | | 348/837 |
| 2015/0138449 A1* | 5/2015 | Rawlinson | .............. | G09G 3/20 |
| | | | | 348/837 |
| 2016/0259365 A1 | 9/2016 | Wang et al. | | |
| 2018/0219052 A1 | 8/2018 | Laack et al. | | |
| 2019/0163232 A1 | 5/2019 | Wang et al. | | |
| 2021/0216183 A1* | 7/2021 | Kang | ................... | B60K 35/00 |

FOREIGN PATENT DOCUMENTS

| | | |
|---|---|---|
| JP | 2016159903 A | 9/2016 |
| WO | 2012046294 A1 | 4/2012 |

* cited by examiner

FIG.12
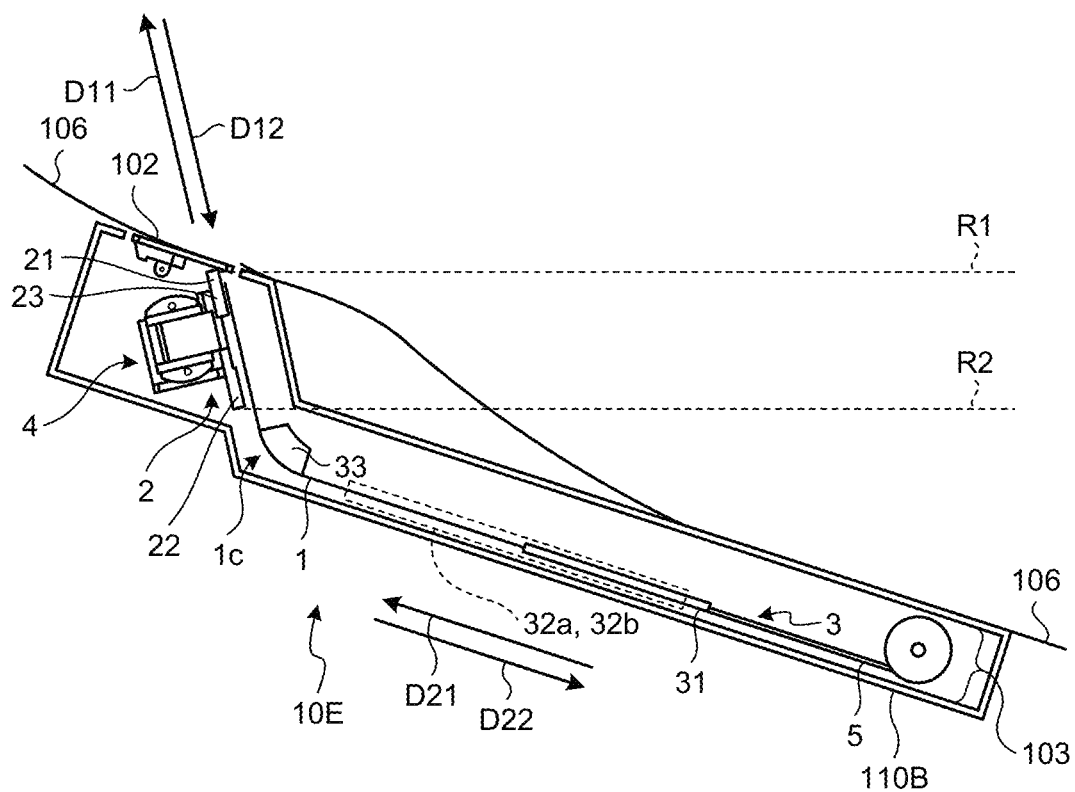
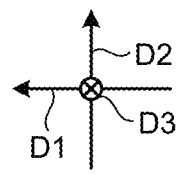

FIG.13
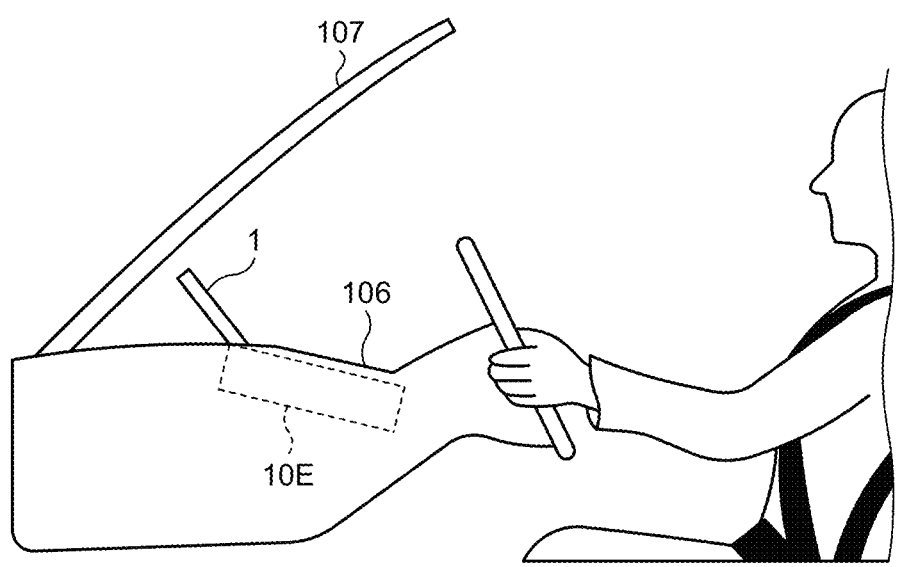
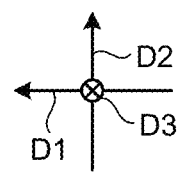

DISPLAY DEVICE

CROSS-REFERENCE TO RELATED APPLICATION

This application is a continuation of International Application No. PCT/JP2021/023878, filed on Jun. 23, 2021 which claims the benefit of priority of the prior Japanese Patent Application No. 2020-110951, filed on Jun. 26, 2020, the entire contents of which are incorporated herein by reference.

BACKGROUND

1. Technical Field

The present disclosure relates to a display device.

2. Related Art

A vehicular display device mounted on a vehicle such as an automobile is so far known. In general, a vehicular display device (hereinafter, simply abbreviated as a "display device") includes a display that displays an image of television, car navigation, etc., and is mounted on a portion such as a dashboard in a vehicle so as to expose the display to the vehicle interior side. As such a display device, a display device that can house a display and has a function of unfolding a display in a housed state to the vehicle interior side as necessary is proposed (see, for example, U.S. Ser. No. 10/086,762 B2).

The display device described in U.S. Ser. No. 10/086,762 B2 includes a flexible display that displays an image and a device main body that houses the flexible display such that the flexible display can be put in and taken out, and is provided on a ceiling lining of the vehicle. The display device further includes an adjustment device in the vicinity of a putting-in/taking-out port of the flexible display, and uses the adjustment device to curve the flexible display extended from the device main body. Thereby, the display device adjusts the orientation of a screen of the flexible display to the occupant side.

SUMMARY

In the display device described in U.S. Ser. No. 10/086, 762 B2 described above, to adjust the screen of the flexible display within the field of view of the occupant, it is necessary to arrange the device main body and the adjustment device side by side in the extending direction of the flexible display when it is housed, that is, in the front-rear direction of the vehicle.

It is an object of the disclosure to at least partially solve the problems in the conventional technology.

In some embodiments, provided is a display device provided inside a vehicle. The display device includes: a display having flexibility and a sheet shape; a movement mechanism that includes a connection connected to a first end portion of the display and in which the connection moves in a direction intersecting a front-rear direction of the vehicle; and a guide mechanism configured to guide a second end portion of the display in a guide direction different from a movement direction of the connection in association with movement of the connection while curving and supporting a part of the display.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 12 is a side view illustrating a configuration example of a display device according to a sixth embodiment of the disclosure;

FIG. 13 is a schematic diagram illustrating an example of a state where the display device according to the sixth embodiment of the disclosure is mounted on a vehicle;

DETAILED DESCRIPTION

Figure 1:
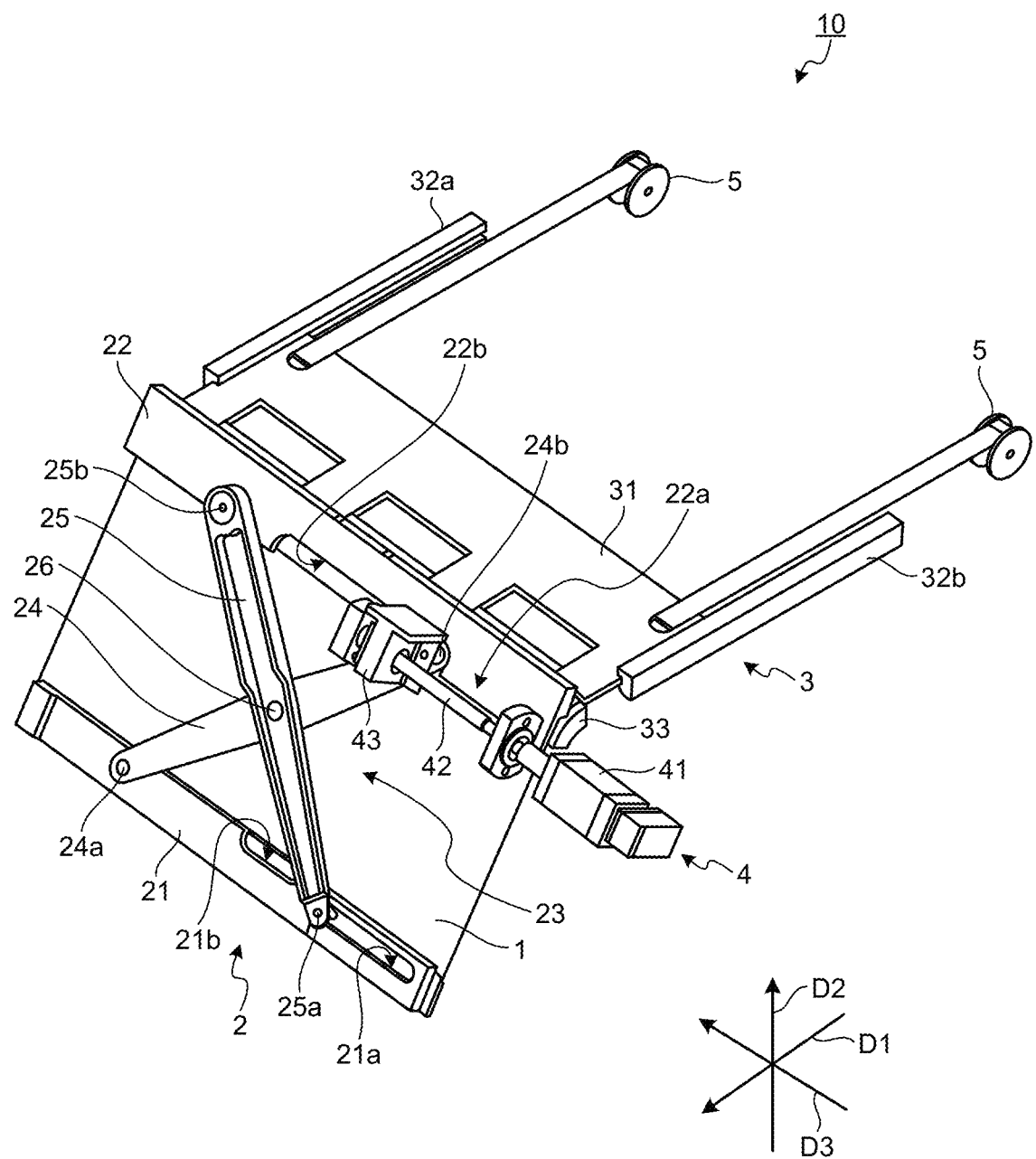
FIG. 1 is a perspective view illustrating a configuration example of a display device according to a first embodiment of the disclosure.

Hereinbelow, preferred embodiments of a display device according to the disclosure are described in detail with reference to the accompanying drawings. The disclosure is not limited by these embodiments. It should be noted that the drawings are schematic, and dimensional relationships of elements, ratios of elements, etc. may be different from actual ones. Further, portions having dimensional relationships or ratios different between drawings may be included. In the drawings, the same components are denoted by the same reference numerals.

First Embodiment

Figure 2A:
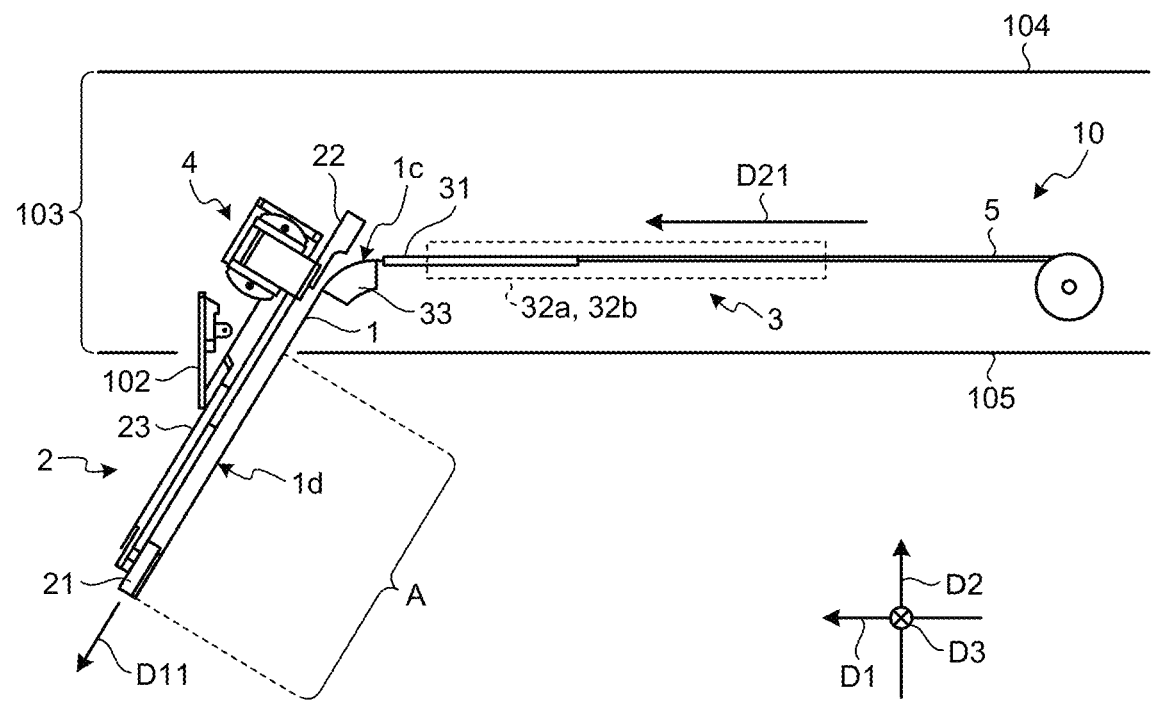
FIG. 2A is a side view illustrating an example of an unfolded state of the display device according to the first embodiment of the disclosure.
Figure 2B:
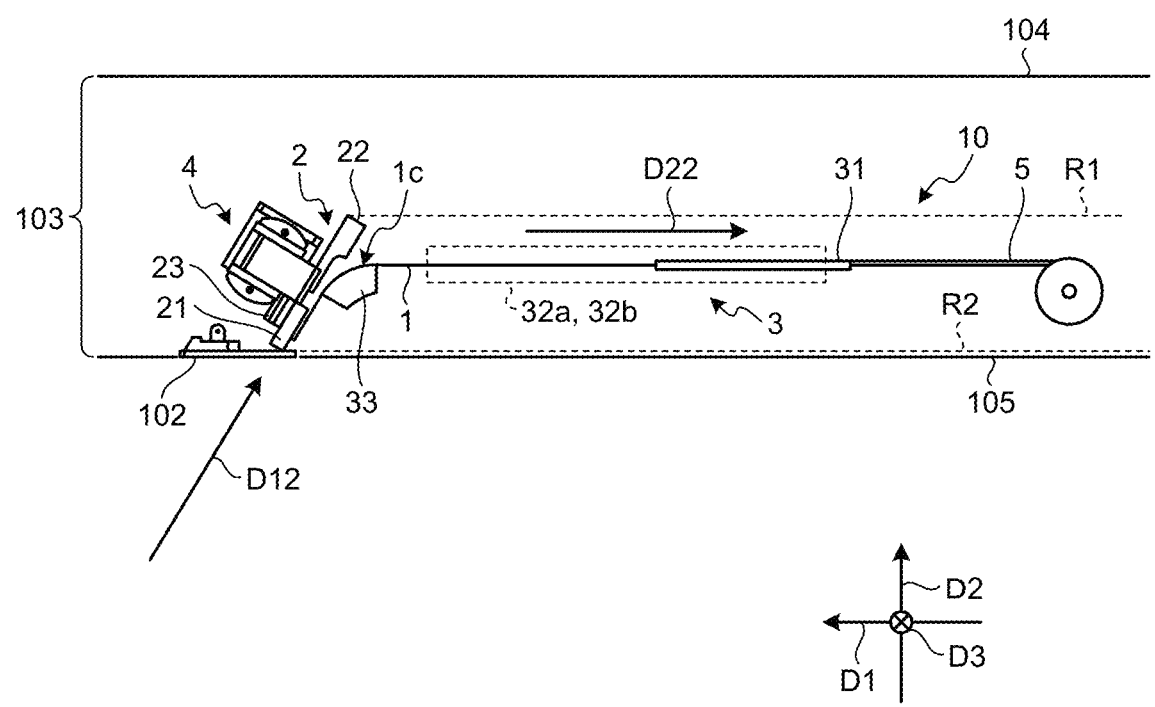
FIG. 2B is a side view illustrating an example of a housed state of the display device according to the first embodiment of the disclosure.
Figure 3:
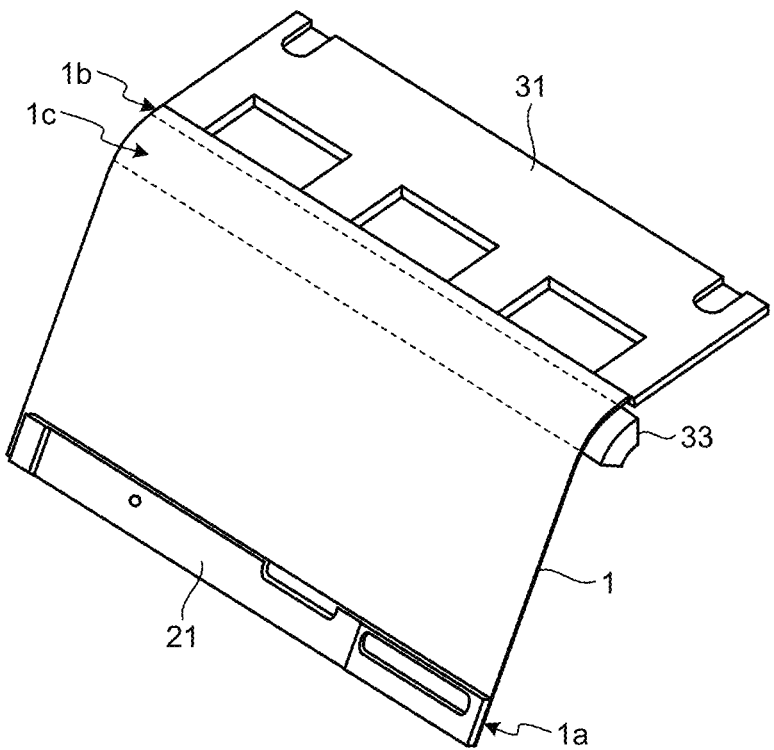
FIG. 3 is a perspective view illustrating an example of a connection structure of a display in the first embodiment of the disclosure.
Figure 4:
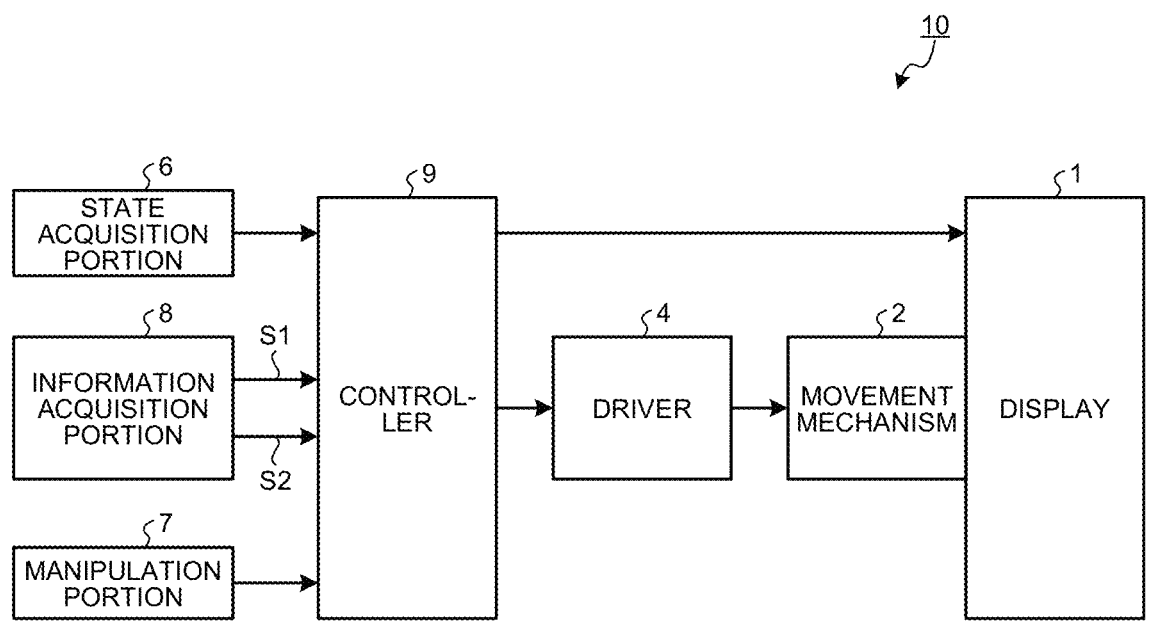
FIG. 4 is a block diagram illustrating an example of a functional configuration of the display device according to the first embodiment of the disclosure.

First, a configuration of a display device according to a first embodiment of the disclosure is described. FIG. 1 is a perspective view illustrating a configuration example of a display device according to a first embodiment of the disclosure. FIG. 2A is a side view illustrating an example of an unfolded state of the display device according to the first embodiment of the disclosure. FIG. 2B is a side view illustrating an example of a housed state of the display device according to the first embodiment of the disclosure. FIG. 3 is a perspective view illustrating an example of a connection structure of a display in the first embodiment of the disclosure. FIG. 4 is a block diagram illustrating an example of a functional configuration of the display device according to the first embodiment of the disclosure.

A display device 10 according to the first embodiment of the disclosure is a rear monitor provided inside a ceiling on the rear seat side of a vehicle. As illustrated in FIGS. 1 to 4, the display device 10 includes a display 1, a movement mechanism 2, a guide mechanism 3, a driver 4, a biasing portion 5, a state acquisition portion 6, a manipulation portion 7, an information acquisition portion 8, and a controller 9. Although not particularly illustrated, in the first embodiment, the "vehicle" means a vehicle on which the display device 10 is mounted.

The display 1 is a display such as an organic EL display or a liquid crystal display, and displays various pieces of information such as an image. Specifically, as illustrated in FIGS. 1 to 3, the display 1 has flexibility, and is configured in a sheet shape. One end portion of the display 1 is fixed to a connection 21 of the movement mechanism 2, and the display 1 is placed such that it enters an unfolded state or a housed state in association with the movement of the connection 21. Further, the display 1 is provided such that, in both the unfolded state and the housed state, it enters a state of, in a curved portion 1c, being curved in a direction intersecting the front-rear direction D1 of the vehicle. The curved portion 1c is, for example as illustrated in FIG. 3, a portion of the display 1 in a state of being curved as described above. In FIG. 3, the curved portion 1c is located in the vicinity of a proximal end portion 1b of the display 1; however, the position of the curved portion 1c in the display 1 changes as the display 1 moves together with the connection 21 of the movement mechanism 2.

One end portion of the display 1 is an end portion on the unfolded side of the display 1, and is, for example as illustrated in FIG. 3, a distal end portion 1a of the display 1. The unfolded state of the display 1 is a state where the display 1 is unfolded in the vehicle interior of the vehicle. The housed state of the display 1 is a state where the display 1 is housed in a housing space 103 formed in the vehicle. For example, as illustrated in FIGS. 2A and 2B, the housing space 103 is formed between a ceiling 104 of the vehicle and a lining 105 of the ceiling 104.

The movement mechanism 2 is a mechanism for unfolding and housing the display 1 inside the vehicle. In the first embodiment, the movement mechanism 2 is, for example, a pantograph-type mechanism, and includes the connection 21, a fixed portion 22, and a link 23 as illustrated in FIG. 1.

The connection 21 is a portion of the movement mechanism 2 connected to the distal end portion 1a of the display 1. Specifically, as illustrated in FIGS. 1 to 3, the connection 21 is formed in a plate shape, and is connected to the back surface of the distal end portion 1a of the display 1 by a technique such as adhesion. The back surface of the display 1 is a surface on the opposite side to a display surface 1d (see FIG. 2A) of the display 1. Such a connection 21 moves in a direction intersecting the front-rear direction D1 of the vehicle in association with the operation of the link 23 described later. For example, as illustrated in FIGS. 2A and 2B, movement directions D11 and D12 of the connection 21 are directions inclined with respect to the front-rear direction D1 and the up-down direction D2 of the vehicle.

Of the movement directions D11 and D12 of the connection 21, the movement direction D11 is a direction in which the connection 21 moves when unfolding the display 1. The movement direction D12 is a direction in which the connection 21 moves when housing the display 1. The movement directions D11 and D12 are directions parallel and opposite to each other.

As illustrated in FIG. 1, a slide groove 21a and a notch 21b are formed in the connection 21. The slide groove 21a is a groove to which an end portion of the link 23 is slidably attached. The notch 21b is opened in a direction in which the connection 21 and the fixed portion 22 face each other, and is formed in a part where a joint 26 of the link 23 is located when the connection 21 comes close to the fixed portion 22. The notch 21b avoids contact between the connection 21 and the joint 26 of the link 23.

The fixed portion 22 is a portion of the movement mechanism 2 fixed to the vehicle. Specifically, as illustrated in FIG. 1, the fixed portion 22 is formed in a plate shape, and is fixedly placed in the vehicle. For example, as illustrated in FIGS. 2A and 2B, the fixed portion 22 is placed in the housing space 103 inside the ceiling of the vehicle, and is fixed to the vehicle. Further, the fixed portion 22 is configured to be in a state of being apart from the display 1 in order to avoid contact with the display 1 that moves in association with the connection 21.

As illustrated in FIG. 1, a slide surface 22a and a notch 22b are formed in the fixed portion 22. The slide surface 22a is a flat surface on which an end portion of the link 23 can slide. The notch 22b is opened in a direction in which the connection 21 and the fixed portion 22 face each other, and is formed in a part where the joint 26 and a middle portion of a first arm 24 of the link 23 are located when the connection 21 comes close to the fixed portion 22. The notch 22b avoids contact between the fixed portion 22, and the joint 26 and the first arm 24 of the link 23.

The link 23 is a mechanism that couples the fixed portion 22 and the connection 21 described above and moves the connection 21 relative to the fixed portion 22. As illustrated in FIG. 1, the link 23 is configured by combining a first arm 24 and a second arm 25 with the joint 26 in a freely rotationally movable manner.

As illustrated in FIG. 1, the first arm 24 has a rotational movement end portion 24a at one end and a slide end portion 24b at the other end. The rotational movement end portion 24a of the first arm 24 is attached to a predetermined part of the connection 21 in a freely rotationally movable manner. The slide end portion 24b of the first arm 24 is attached to a bracket 43 of the driver 4 described later in a freely rotationally movable manner. By an action of the driver 4, the slide end portion 24b slides in the axial direction of a drive shaft of the driver 4 along the slide surface 22a of the fixed portion 22.

As illustrated in FIG. 1, the second arm 25 is configured to have a slide end portion 25a at one end and a rotational movement end portion 25b at the other end. The slide end portion 25a of the second arm 25 is attached to the slide groove 21a of the connection 21. The slide end portion 25a slides along the slide groove 21a in conjunction with the operation of the first arm 24 described above. The rotational movement end portion 25b of the second arm 25 is attached to a predetermined part of the fixed portion 22 in a freely rotationally movable manner.

As illustrated in FIGS. 2A and 2B, the link 23 configured as described above is provided in the housing space 103 such that the link 23 can enter and exit between the vehicle interior of the vehicle and the housing space 103 by performing extension and contraction operations along the movement directions D11 and D12.

As illustrated in FIGS. 2A and 2B, the guide mechanism 3 is a mechanism that, while curving and supporting a part of the display 1, guides another end portion of the display 1 in guide directions D21 and D22 in association with the movement of the connection 21 of the movement mechanism 2. As illustrated in FIG. 1, the guide mechanism 3 includes a connection plate 31, a pair of guide rails 32a and 32b, and a support 33, and is provided in the housing space 103 illustrated in FIGS. 2A and 2B.

The other end portion of the display 1 is an end portion on a side where the display 1 is housed, and is, as illustrated in FIG. 3, the proximal end portion 1b on the opposite side to the distal end portion 1a described above of the display 1. As illustrated in FIGS. 2A and 2B, the guide directions D21 and D22 are directions different from the movement directions D11 and D12 of the connection 21 of the movement mechanism 2. For example, the guide directions D21 and D22 are parallel to the front-rear direction D1 of the vehicle. Of such guide directions D21 and D22, the guide direction D21 is a direction in which the display 1 is guided when unfolding the display 1. The guide direction D22 is a direction in which the display 1 is guided when housing the display 1. The guide directions D21 and D22 are directions parallel and opposite to each other.

The connection plate 31 is an example of, in the guide mechanism 3, an other-end connection connected to the proximal end portion 1b of the display 1. Specifically, as illustrated in FIGS. 1 to 3, the connection plate 31 is connected to the proximal end portion 1b of the display 1 by a technique such as adhesion, and is placed in the housing space 103 to be parallel to the guide directions D21 and D22. The connection plate 31 moves in the guide direction D21 or the guide direction D22 together with the display 1 in conjunction with the movement of the connection 21 of the movement mechanism 2.

For example, when unfolding the display 1, as illustrated in FIG. 2A, the connection plate 31 moves in the guide direction D21 together with the proximal end portion 1b of the display 1 as the connection 21 of the movement mechanism 2 moves in the movement direction D11. At this time, the connection plate 31 can move in the guide direction D21 until the connection 21 becomes most distant from the fixed portion 22 in the movement mechanism 2. Further, for example when housing the display 1, as illustrated in FIG. 2B, the connection plate 31 moves in the guide direction D22 together with the proximal end portion 1b of the display 1 as the connection 21 of the movement mechanism 2 moves in the movement direction D12. At this time, the connection plate 31 can move in the guide direction D22 until the connection 21 comes closest to the fixed portion 22 in the movement mechanism 2. That is, the movable range in the guide directions D21 and D22 of the connection plate 31 is the same length as the movable range in the movement directions D11 and D12 of the connection 21 in the movement mechanism 2. Further, the movable range in the guide directions D21 and D22 of the connection plate 31 corresponds to the movable range in the guide directions D21 and D22 of the display 1 in the housing space 103.

The guide rails 32a and 32b are rail structural bodies that regulate the movement direction of the connection plate 31 in the guide mechanism 3. Specifically, as illustrated in FIG. 1, the guide rails 32a and 32b are fixedly arranged in the housing space 103 in such a manner as to slidably hold both end portions in the width direction of the connection plate 31. The guide directions D21 and D22 described above are directions in which the guide rails 32a and 32b extend. The width direction of the connection plate 31 is a direction perpendicular to the guide directions D21 and D22 of the guide mechanism 3 and to the direction perpendicular to the surface of the connection plate 31. For example, as illustrated in FIG. 1, the width direction of the connection plate 31 is parallel to the left-right direction D3 of the vehicle. As illustrated in FIGS. 2A and 2B, such guide rails 32a and 32b regulate the movement direction of the connection plate 31 in the housing space 103 to the guide directions D21 and D22.

The support 33 is a structural body that supports a part of the display 1 while curving the part. Specifically, as illustrated in FIGS. 1 to 3, the support 33 is placed in the housing space 103 to be located between the fixed portion 22 of the movement mechanism 2 and the connection plate 31 of the guide mechanism 3. The support 33 has a curved support surface, and uses the support surface to freely slidably support a part of the display 1 while curving the part from the display surface 1d side. A portion of the display 1 supported by the support 33 is the curved portion 1c. The support surface of the support 33 is preferably subjected to surface processing such as mirror finishing so as to reduce frictional force with the display 1.

The driver 4 drives the movement mechanism 2 or the guide mechanism 3. In the first embodiment, the driver 4 drives the movement mechanism 2. Specifically, as illustrated in FIG. 1, the driver 4 includes a motor 41, a ball screw 42, and a bracket 43, and is provided on the fixed portion 22 of the movement mechanism 2.

The motor 41 is, for example, an electric motor, and the ball screw 42 is attached thereto as illustrated in FIG. 1. The ball screw 42 is an example of a drive shaft of the driver 4, and is operated by the driving force of the motor 41. For example, the axial direction of the ball screw 42 is a direction perpendicular to the movement directions D11 and D12 (see FIGS. 2A and 2B) of the connection 21 of the movement mechanism 2. In the first embodiment, the axial direction of the ball screw 42 is parallel to the left-right direction D3 of the vehicle. As illustrated in FIG. 1, the bracket 43 is attached to the ball screw 42 to be movable in the axial direction of the ball screw 42. The slide end portion 24b of the first arm 24 in the link 23 described above is attached to the bracket 43 in a freely rotationally movable manner. The ball screw 42 is operated by the driving force of the motor 41 to move the bracket 43 in the axial direction along the slide surface 22a of the fixed portion 22 together with the slide end portion 24b of the first arm 24. Thus, the driver 4 operates the link 23 to move the connection 21 in the movement directions D11 and D12.

The biasing portion 5 biases the display 1 in the guide direction D22. Specifically, as illustrated in FIG. 1, the biasing portion 5 is formed of, for example, an elastic member such as a spiral torsion spring, and is connected to the connection plate 31 of the guide mechanism 3. As illustrated in FIGS. 2A and 2B, the biasing portion 5 can extend and contract in association with the movement in the guide directions D21 and D22 of the connection plate 31 in the guide mechanism 3, and gives a bias in the direction in which the display 1 extends along the guide direction D22. When unfolding or housing the display 1, the biasing portion 5 pulls the display 1 together with the connection plate 31 in the guide direction D22 by biasing force in the direction mentioned above.

Here, in the display device 10 according to the first embodiment, for example as illustrated in FIG. 2B, when the display 1 is housed in the housing space 103 together with the connection 21 of the movement mechanism 2, etc., the display 1 is in a state of being most extended within the movable range in the guide directions D21 and D22. That is, the housed state of the display 1 is "a state where the display 1 is most extended within the movable range in the guide directions D21 and D22".

In the housed state, as illustrated in FIG. 2B, the curved portion 1c of the display 1 is located between two virtual planes R1 and R2 in the display device 10. The virtual planes R1 and R2 are planes that pass through both ends of the movement mechanism 2 in a direction orthogonal to the front-rear direction D1 of the vehicle and are parallel to the front-rear direction D1. In the first embodiment, examples of the direction orthogonal to the front-rear direction D1 of the vehicle include the up-down direction D2 of the vehicle. In this case, one virtual plane R1 passes through one end of the movement mechanism 2 in the up-down direction D2 of the vehicle, specifically, the upper end of the fixed portion 22 of the movement mechanism 2. The other virtual plane R2 passes through the other end of the movement mechanism 2 in the up-down direction D2 of the vehicle, specifically, the lower end of the connection 21 of the movement mechanism 2.

In the first embodiment, as illustrated in FIG. 2B, the guide mechanism 3 and the biasing portion 5 are placed to be located between the two virtual planes R1 and R2. Specifically, the connection plate 31, the guide rails 32a and 32b, and the support 33 included in the guide mechanism 3 are always located between the virtual planes R1 and R2 regardless of whether the display 1 is in the housed state or the unfolded state. Similarly, the biasing portion 5 is always located between the virtual planes R1 and R2 regardless of the state of the display 1.

As illustrated in FIGS. 2A and 2B, the lining 105 forming the housing space 103 inside the ceiling of the vehicle is provided with an opening/closing panel 102 that opens and closes an entrance/exit port of the display 1. The opening/closing panel 102 is axially supported at the lining 105 in a freely rotationally movable manner so as to be able to open and close the entrance/exit port of the display 1 formed in the lining 105. Further, a spring member (not illustrated) that biases the entrance/exit port in a closing direction is attached to the opening/closing panel 102. For example, as illustrated in FIG. 2B, when the display 1 is in the housed state, the opening/closing panel 102 is in a state where the entrance/exit port is closed by the biasing force of the spring member. On the other hand, when the connection 21 is pressed by the movement mechanism 2, as illustrated in FIG. 2A, the opening/closing panel 102 is in a state where the entrance/exit port is opened by the pressing force of the movement mechanism 2.

The state acquisition portion 6 (see FIG. 4) acquires the state of the vehicle and the state of the display 1. Specifically, the state acquisition portion 6 is provided inside the vehicle, and is electrically connected to the controller 9 as illustrated in FIG. 4. The state acquisition portion 6 acquires the state of the vehicle, and transmits information indicating the acquired state of the vehicle to the controller 9. Examples of the state of the vehicle acquired by the state acquisition portion 6 include states such as the position of a shift lever of the vehicle and the presence or absence of an occupant in the rear seat. Further, the state acquisition portion 6 is electrically connected to the motor 41 of the driver 4, and acquires the state of the display 1 on the basis of the number of rotations of the motor 41, etc. Examples of the state of the display 1 acquired by the state acquisition portion 6 include the fully unfolded state and the housed state of the display 1. The state acquisition portion 6 acquires such a state of the display 1, and transmits information indicating the acquired state of the display 1 to the controller 9.

The manipulation portion 7 is for manipulating the display device 10. Specifically, the manipulation portion 7 is formed of an input device such as an input button, and is provided inside the vehicle. As illustrated in FIG. 4, the manipulation portion 7 is electrically connected to the controller 9, and inputs various pieces of information to the controller 9 in accordance with input manipulations by a user. Examples of the information inputted to the controller 9 by the manipulation portion 7 include information for unfolding the display 1, information for housing the display 1, information for adjusting the amount of unfolding of the display 1, etc. The controller 9 described later can, on the basis of input information from the manipulation portion 7, control the driver 4 in order to bring the display 1 into the unfolded state or the housed state or to adjust the amount of unfolding of the display 1.

The information acquisition portion 8 acquires information (hereinafter, referred to as object-to-be-displayed information) such as an image to be displayed on the display 1. Specifically, the information acquisition portion 8 is provided inside the vehicle, and is electrically connected to the controller 9 as illustrated in FIG. 4. For example, the information acquisition portion 8 acquires object-to-be-displayed information from a device in the vehicle, and every time of acquisition, transmits the acquired object-to-be-displayed information to the controller 9. The device in the vehicle is a device mounted or carried in the vehicle. Examples of the device in the vehicle include a receiver such as a tuner mounted on the vehicle, an in-vehicle device such as a player, an air conditioner, or a car navigation device, and a portable information terminal such as a smartphone or a tablet terminal carried in the vehicle. The object-to-be-displayed information is classified into a first type of information S1 and a second type of information S2. The first type of information S1 is object-to-be-displayed information displayed on the entire display surface 1d of the display 1. Examples of the first type of information S1 include an image of television broadcasting or Internet broadcasting received by a receiver mounted on the vehicle, an image saved on a recording medium such as a DVD that can be reproduced by a player, etc. On the other hand, the second type of information S2 is object-to-be-displayed information having a smaller display area than the first type of information S1. Examples of the second type of information S2 include information of an air conditioner mounted on the vehicle (hereinafter, referred to as air conditioner information), information of car navigation (hereinafter, referred to as navigation information), advertisement information indicating an advertisement, information of a social networking service (hereinafter, referred to as SNS information), etc.

The controller 9 controls various operations of the display device 10. Specifically, the controller 9 is composed of a CPU that executes a processing program, a memory, etc., and is provided inside the vehicle. As illustrated in FIG. 4, the controller 9 is electrically connected to components of the display device 10, such as the display 1 and the driver 4. The controller 9 is operated by electric power supplied from a power source (not illustrated) of the vehicle, and controls the display 1 and the driver 4.

For example, the controller 9 receives object-to-be-displayed information from the information acquisition portion 8 described above, and every time of reception, performs control to cause the display 1 to display the received object-to-be-displayed information. Further, the controller 9 controls the driver 4 to, in accordance with the type of object-to-be-displayed information displayed by the display 1, adjust the amount of unfolding A of the display 1 unfolded in the movement direction D11 in association with the movement of the connection 21 of the movement mechanism 2. The amount of unfolding A of the display 1 is the amount of unfolding of the display surface 1d unfolded by the display 1 above the seat of the vehicle interior (for example, above the rear seat) (see FIG. 2A). For example, the amount of unfolding A of the display 1 is represented by the area of a portion of the display surface 1d unfolded from the housing space 103 into the vehicle interior (that is, a display area). When the object-to-be-displayed information is the first type of information S1, the controller 9 controls the driver 4 so that the display surface 1d of the display 1 is fully unfolded in the movement direction D11 in accordance with the display area of the first type of information S1. On the other hand, when the object-to-be-displayed information is the second type of information S2, the controller 9 controls the driver 4 so that the display surface 1d of the display 1 is partially unfolded in the movement direction D11 in accordance with the display area of the second type of information S2.

Figure 5:
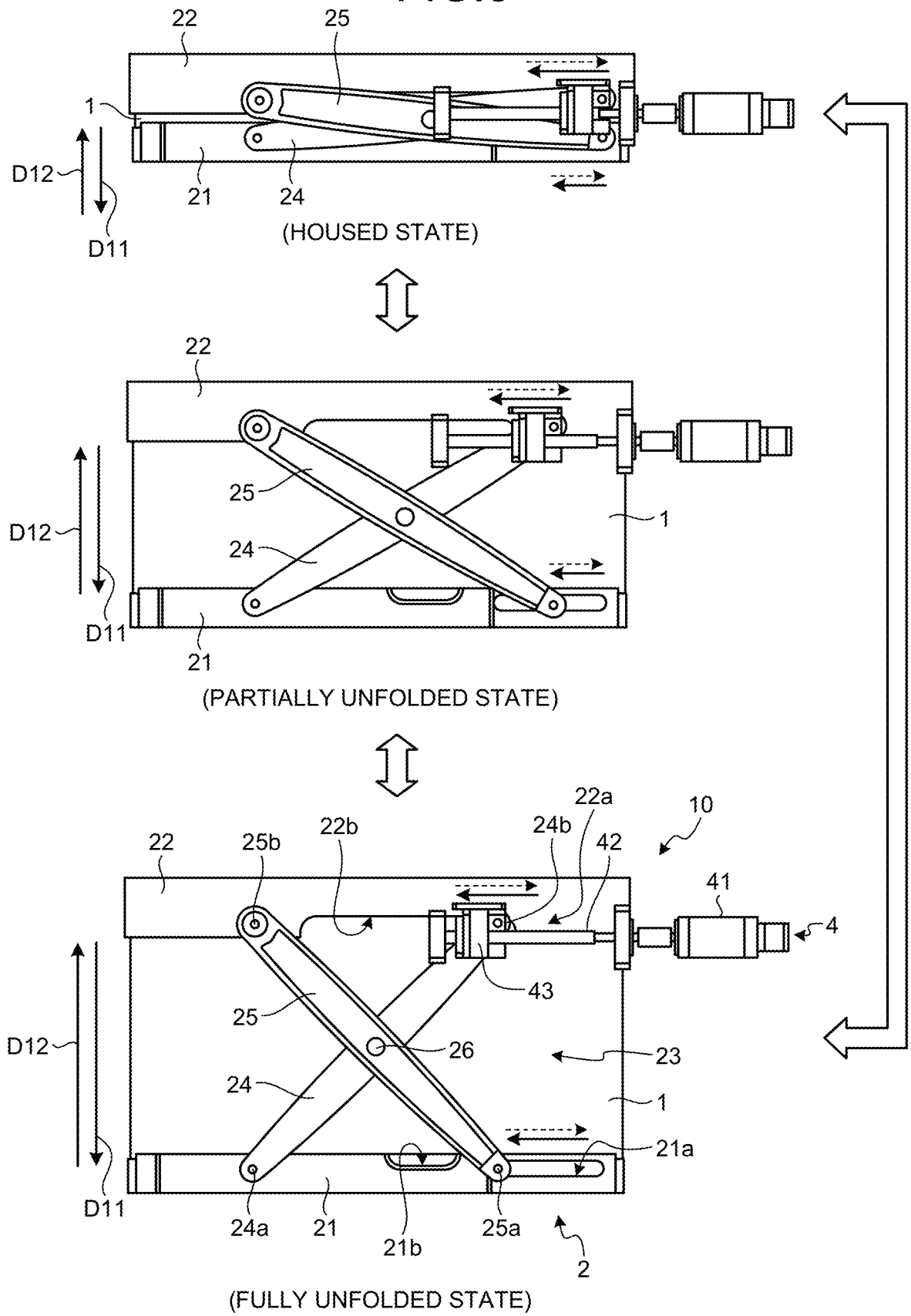
FIG. 5 is an explanatory diagram describing an operation of a movement mechanism for unfolding and housing the display.

Next, an operation of the movement mechanism 2 in the first embodiment of the disclosure is described. FIG. 5 is an explanatory diagram describing an operation of the movement mechanism for unfolding and housing the display. In the first embodiment, the movement mechanism 2 is operated by the driving of the driver 4, and brings the display 1 into the housed state or the unfolded state. The housed state of the display 1 is a state where the display 1 is housed in the housing space 103 as illustrated in FIG. 2B described above. The unfolded state of the display 1 is a state where the display 1 is unfolded from the housing space 103 into the vehicle interior of the vehicle as illustrated in FIG. 2A described above. The unfolded state includes a fully unfolded state where the display surface 1d of the display 1 is fully unfolded and a partially unfolded state where the display surface 1d of the display 1 is partially unfolded.

Specifically, as illustrated in FIG. 5, when the display 1 is in the housed state, in the movement mechanism 2 the connection 21 is in a state of being closest to the fixed portion 22 in the movement directions D11 and D12. In this case, the link 23 is in a state of being most contracted in the movement directions D11 and D12 such that the first arm 24 and the second arm 25 overlap with each other. Further, the link 23 can avoid contact with the connection 21 and the fixed portion 22 by means of the notch 21b of the connection 21 and the notch 22b of the fixed portion 22. Therefore, the approach between the connection 21 and the fixed portion 22 is not inhibited by the contact mentioned above.

When bringing the display 1 in the housed state into the unfolded state, in the driver 4, the motor 41 rotationally drives the ball screw 42 in a predetermined direction, and thereby moves the bracket 43 to one side in the axial direction of the ball screw 42 (the direction of a solid arrow in FIG. 5). In this case, in the movement mechanism 2, the link 23 operates to extend in the movement direction D11. Specifically, as illustrated in FIG. 5, in the first arm 24, while the rotational movement end portion 24a rotationally moves, the slide end portion 24b is slid in the direction of the solid arrow along the slide surface 22a of the fixed portion 22 together with the bracket 43 of the driver 4. In conjunction with the first arm 24, in the second arm 25, while the rotational movement end portion 25b rotationally moves, the slide end portion 25a is slid in the direction of the solid arrow along the slide groove 21a of the connection 21. By the extension operation of the link 23, as illustrated in FIG. 5, the connection 21 moves in the movement direction D11 so as to become apart from the fixed portion 22.

The display 1 slides to extend in the movement direction D11 in association with the movement of the connection 21. Thereby, as illustrated in FIG. 5, the display 1 enters a partially unfolded state where the display surface 1d (see FIG. 2A) is partially unfolded.

When the driver 4 continues the rotational driving of the ball screw 42 by the motor 41 and continues to move the bracket 43 to one side in the axial direction, the link 23 of the movement mechanism 2 operates until it extends longest within the movable range in the movement direction D11. Specifically, as illustrated in FIG. 5, in the first arm 24, while the rotational movement end portion 24a continues to rotationally move, the slide end portion 24b continues to be slid in the direction of the solid arrow along the slide surface 22a of the fixed portion 22 together with the bracket 43. In conjunction with the first arm 24, in the second arm 25, while the rotational movement end portion 25b continues to rotationally move, the slide end portion 25a continues to be slid in the direction of the solid arrow. The second arm 25 continues the above operation until the slide end portion 25a comes into contact with one end portion in the longitudinal direction of the slide groove 21a of the connection 21. By the extension operation of the link 23, as illustrated in FIG. 5, the connection 21 continuously moves in the movement direction D11 until it becomes most distant from the fixed portion 22 within the movable range in the movement direction D11.

In association with the continuous movement of the connection 21, the display 1 slides to enter a state of being most extended within the movable range in the movement direction D11. Thereby, as illustrated in FIG. 5, the display 1 enters a fully unfolded state where the display surface 1d (see FIG. 2A) is fully unfolded.

On the other hand, when bringing the display 1 in the partially unfolded state or the fully unfolded state into the housed state, in the driver 4, the motor 41 rotationally drives the ball screw 42 in the opposite direction, and thereby moves the bracket 43 to the other side in the axial direction of the ball screw 42, that is, in the opposite direction to the solid arrow (the direction of a broken arrow in FIG. 5). In this case, the movement mechanism 2 performs an operation in the opposite direction to that on the above-described occasion of bringing the display 1 into the unfolded state, and contracts the link 23 in the movement direction D12. By the contraction operation of the link 23, as illustrated in FIG. 5, the connection 21 moves in the movement direction D12 so as to come close to the fixed portion 22.

After that, the driver 4 continues the above driving until the display 1 enters the housed state. In this case, the link 23 of the movement mechanism 2 operates until it contracts shortest within the movable range in the movement direction D12. In this case, the movement mechanism 2 continuously performs the operation in the opposite direction to that on the above-described occasion of bringing the display 1 into the unfolded state, and contracts the link 23 so that it becomes shortest within the movable range in the movement direction D12. By the further contraction operation of the link 23, as illustrated in FIG. 5, the connection 21 continuously moves in the movement direction D12 until it comes closest to the fixed portion 22 within the movable range in the movement direction D12.

In association with the movement of the connection 21 in the movement direction D12, the display 1 slides to enter a state of being most contracted within the movable range in the movement direction D12. Thereby, as illustrated in FIG. 5, the display 1 enters a housed state where the display surface 1*d* is housed in the housing space 103 (see FIG. 2B).

When adjusting the amount of unfolding A (see FIG. 2A) of the display 1, in the driver 4 the motor 41 rotationally drives the ball screw 42 in a predetermined direction or the opposite direction. Thereby, the bracket 43 moves to one side (the direction of a solid arrow in FIG. 5) or the other side (the direction of a broken arrow in FIG. 5) in the axial direction of the ball screw 42. In this case, in the movement mechanism 2, the link 23 extends or contracts in the movement direction D11 or D12 like on the above-disclosed occasion of bringing the display 1 into the unfolded state or the housed state. By the extension or contraction operation of the link 23, as illustrated in FIG. 5, the connection 21 moves in the movement direction D11 in which it becomes apart from the fixed portion 22 or the movement direction D12 in which it comes close to the fixed portion 22.

By the movement in the movement direction D11 or D12 of the connection 21 described above, as illustrated in FIG. 5, the movement mechanism 2 slides the display 1 in the movement direction D11 or the movement direction D12. Thereby, the extension length in the movement direction D11 or D12 of the display 1 is adjusted in accordance with the separation distance between the connection 21 and the fixed portion 22, and the amount of unfolding A of the display 1 becomes an amount of unfolding according to the separation distance.

Figure 6:
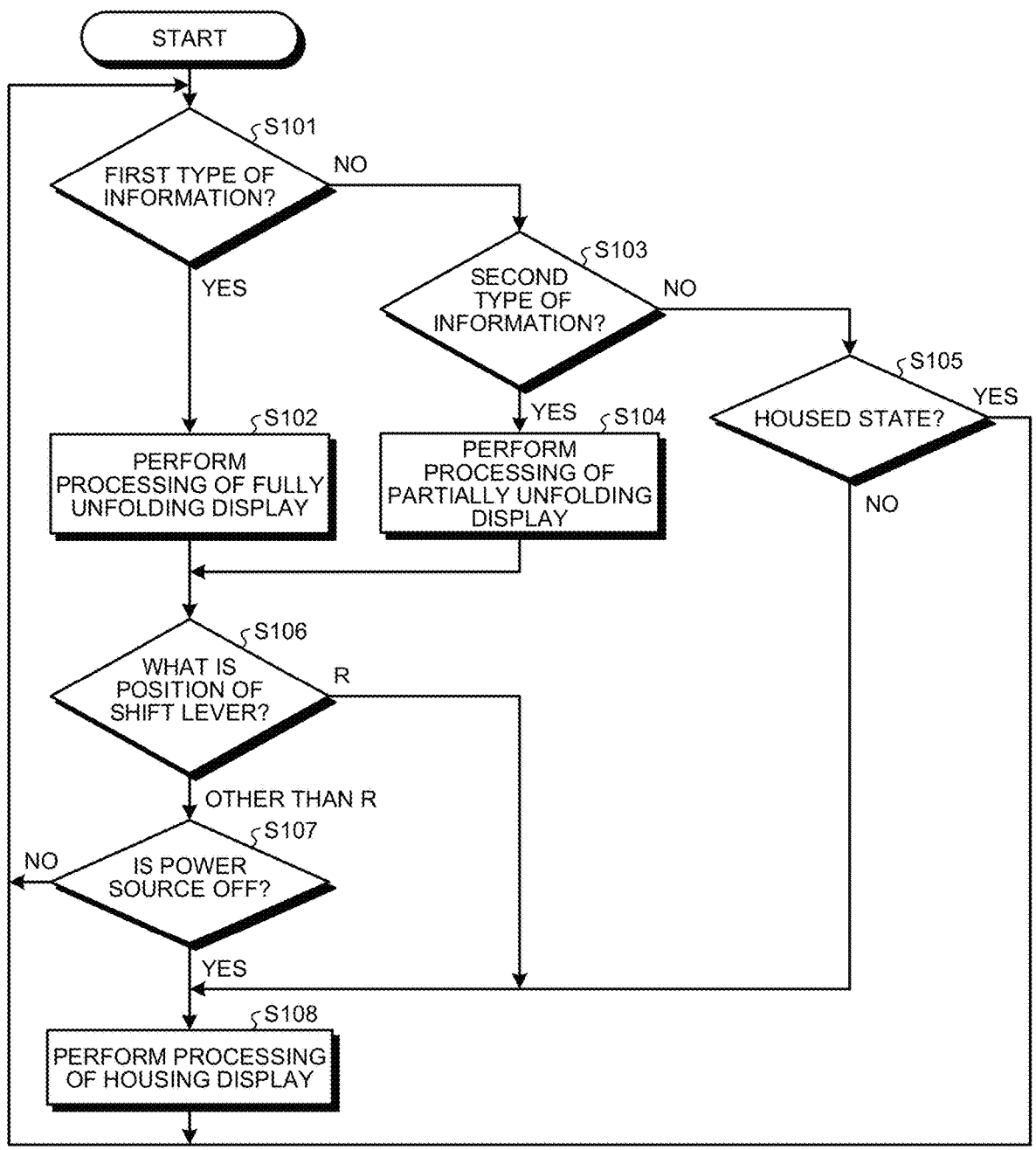
FIG. 6 is a flowchart illustrating an example of an operation of the display device according to the first embodiment of the disclosure.

Next, an operation of the display device 10 regarding the unfolding or housing of the display 1 in the first embodiment is be described. FIG. 6 is a flowchart illustrating an example of an operation of the display device according to the first embodiment of the disclosure. In the first embodiment, the display device 10 is activated by being supplied with electric power from a power source of the vehicle. After that, the display device 10 appropriately performs the pieces of processing of steps S101 to S108 illustrated in FIG. 6, and unfolds or houses the display 1 while adjusting the amount of unfolding A of the display 1 in accordance with the type of object-to-be-displayed information.

Specifically, as illustrated in FIG. 6, the display device 10 decides whether the object-to-be-displayed information of the display 1 is the first type of information S1 or not (step S101). In step S101, when the information acquisition portion 8 has acquired object-to-be-displayed information from a device in the vehicle, the controller 9 decides whether the acquired object-to-be-displayed information is the first type of information S1 or not. The information acquisition portion 8 acquires object-to-be-displayed information from a receiver that receives television broadcasting or Internet broadcasting, or acquires object-to-be-displayed information from a player that reproduces an image recorded on a recording medium such as a DVD. In this case, the controller 9 decides that the type of the object-to-be-displayed information received from the information acquisition portion 8 is the first type of information S1.

In the case where the object-to-be-displayed information is the first type of information S1 (step S101: Yes), the display device 10 executes the processing of fully unfolding the display 1 (step S102). In the full unfolding processing of step S102, the controller 9 acquires information indicating the state of the display 1 from the state acquisition portion 6, and decides whether the display 1 is in the fully unfolded state or not on the basis of the acquired information. In the case where the display 1 is in the fully unfolded state, the controller 9 controls the driver 4 to maintain the current state of the display 1. Thereby, the controller 9 keeps the driver 4 from performing driving of further unfolding the display 1 already in the fully unfolded state, and prevents a failure due to an excessive load on the driver 4 (particularly the motor 41). On the other hand, in the case where the display 1 is not in the fully unfolded state, that is, in the case where the display 1 is in the partially unfolded state or the housed state, the controller 9 controls the driver 4 to fully unfold the display surface 1*d* of the display 1 in the partially unfolded state or the housed state from the housing space 103 into the vehicle interior of the vehicle. By performing driving on the basis of the control of the controller 9, the driver 4 brings the movement mechanism 2 into a state of being most extended in the movement direction D11. At this time, in the movement mechanism 2, as illustrated in FIG. 5 described above, the link 23 operates to extend most in the movement direction D11, and in conjunction with the extension operation of the link 23, the connection 21 moves in the movement direction D11 to become most distant from the fixed portion 22. When bringing the display 1 in the housed state into the fully unfolded state, the connection 21 pushes and opens the opening/closing panel 102 at the entrance/exit port of the housing space 103, and moves in the movement direction D11.

On the other hand, in the case where, in step S101 described above, the information acquisition portion 8 has not acquired the first type of information S1 as object-to-be-displayed information, the controller 9 decides that the object-to-be-displayed information is not the first type of information S1 (step S101: No). In this case, the display device 10 decides whether the object-to-be-displayed information of the display 1 is the second type of information S2 or not (step S103). In step S103, in the case where the information acquisition portion 8 has acquired object-to-be-displayed information from, for example, an air conditioner or a car navigation device of the vehicle, or a portable information terminal carried in the vehicle, the controller 9 decides that the object-to-be-displayed information received from the information acquisition portion 8 is the second type of information S2.

In the case where the object-to-be-displayed information is the second type of information S2 (step S103: Yes), the display device 10 executes the processing of partially unfolding the display 1 (step S104). In the partial unfolding processing of step S104, the controller 9 controls the driver 4 so that the display surface 1*d* of the display 1 in the housed state is partially unfolded from the housing space 103 into the vehicle interior of the vehicle in accordance with the display area of the second type of information S2. By performing driving on the basis of the control of the controller 9, the driver 4 brings the movement mechanism 2 into a state of being extended in the movement direction D11 in accordance with the display area of the second type of information S2. At this time, the movement mechanism 2 extends the link 23 in the movement direction D11 such that, for example, the product of the width of the display surface 1*d* (the length in a direction perpendicular to the movement direction D11) and the movement distance in the movement direction D11 of the connection 21 is almost equal to the display area of the second type of information S2.

After the execution of step S102 or step S104 described above, the display device 10 decides the position of the shift lever of the vehicle (step S106). In step S106, the state acquisition portion 6 acquires, for example, the position of the shift lever as the state of the vehicle from a sensor in the vehicle. When the shift lever is switched to the rearward position (for example, the position indicated by "R"), the state acquisition portion 6 acquires the position of the shift lever in the switched state, and transmits a signal indicating the acquired position of the shift lever to the controller 9. On the basis of the signal acquired from the state acquisition portion 6, the controller 9 decides that the position of the shift lever is the rearward position.

In the case where the position of the shift lever of the vehicle is the rearward position (step S106: R), the display device 10 executes the processing of housing the display 1 (step S108), and then returns to step S101 described above and repeats the processing of step S101 and subsequent steps.

In the housing processing of step S108, the controller 9 controls the display 1 to end displaying, and controls the driver 4 so that the display 1 in the fully unfolded state or the partially unfolded state is housed into the housing space 103. The display 1 ends the displaying of object-to-be-displayed information on the basis of the control of the controller 9. By performing driving on the basis of the control of the controller 9, the driver 4 brings the movement mechanism 2 into a state of being most contracted in the movement direction D12. At this time, in the movement mechanism 2, as illustrated in FIG. 5 described above, the link 23 operates to contract most in the movement direction D12, and in conjunction with the contraction operation of the link 23, the connection 21 moves in the movement direction D12 to become closest to the fixed portion 22. By such an operation of the movement mechanism 2, as illustrated in FIG. 2B, the display 1 slides in the movement direction D12 together with the connection 21 and is guided in the guide direction D22 by the guide mechanism 3, and is housed in the housing space 103. In association with the housing of the display 1, the opening/closing panel 102 closes the entrance/exit port of the housing space 103.

On the other hand, in step S106 described above, in the case where the controller 9 has not acquired from the state acquisition portion 6 a signal indicating that the position of the shift lever is the rearward position, the controller 9 decides that the position of the shift lever of the vehicle is not the rearward position. In this case (step S106: other than R), the display device 10 decides whether the power source of the vehicle is in the off state or not (step S107).

In step S107, in the case where an ignition power source or an accessory power source of the vehicle is switched from the on state to the off state by a key manipulation or the like, the controller 9 decides that the power source of the vehicle is in the off state. In the case where the ignition power source or the accessory power source of the vehicle is switched from the off state to the on state by a key manipulation or the like, the controller 9 decides that the power source of the vehicle is in the on state.

In the case where the power source of the vehicle is in the off state (step S107: Yes), the display device 10 proceeds to step S108 described above, and repeats the processing of step S108 and subsequent steps. On the other hand, in the case where the power source of the vehicle is in the on state (step S107: No), the display device 10 returns to step S101 without performing step S108 described above, and repeats the processing of step S101 and subsequent steps.

In the case where the controller 9 decides in step S101 that there is no first type of information S1 (step S101: No) and decides in step S103 that there is no second type of information S2 (step S103: No), the display device 10 decides whether the display 1 is in the housed state or not (step S105). In step S105, on the basis of information from the state acquisition portion 6, the controller 9 decides whether the movement mechanism 2 is in a state of being most contracted in the movement direction D12 or not, that is, whether the display 1 is in the housed state or not.

In the case where the display 1 is not in the housed state (step S105: No), the display device 10 proceeds to step S108 described above, and repeats the processing of step S108 and subsequent steps. On the other hand, in the case where the display 1 is in the housed state (step S105: Yes), the display device 10 returns to step S101 without performing step S108 described above, and repeats the processing of step S101 and subsequent steps. Thereby, the controller 9 of the display device 10 keeps the driver 4 from performing driving of further housing the display 1 already in the housed state, and prevents a failure due to an excessive load on the driver 4 (particularly the motor 41).

As described hereinabove, in the first embodiment of the disclosure, in the display device 10 provided inside a vehicle, one end portion of the sheet-like display 1 having flexibility is connected to the connection 21 of the movement mechanism 2, and a configuration is employed in which the connection 21 moves in a direction intersecting the front-rear direction D1 of the vehicle and the guide mechanism 3, while curving and supporting a part of the display 1, guides another end portion of the display 1 in the guide directions D21 and D22 different from the movement directions D11 and D12 of the connection 21 in association with the movement of the connection 21.

Therefore, the display 1 can be unfolded in the vehicle interior of the vehicle along the movement directions D11 and D12 of the connection 21 of the movement mechanism 2, and the space required for installation and operation of the movement mechanism 2 inside the vehicle can be reduced in the front-rear direction D1 of the vehicle. Thereby, the occupied space of the display device 10 inside the vehicle can be made smaller, and as a result the limited space of the inside of the vehicle can be more widely utilized.

Further, in the display device 10 according to the first embodiment of the disclosure, the curved portion 1*c* of the display 1 is located between two virtual planes R1 and R2 that, in a state where the display 1 is most extended within the movable range in the guide directions D21 and D22, pass through both ends of the movement mechanism 2 in a direction orthogonal to the front-rear direction D1 and are parallel to the front-rear direction D1. Therefore, the space required for installation and operation of the guide mechanism 3 inside the vehicle can be reduced in a direction orthogonal to the front-rear direction D1 of the vehicle. As a result, the occupied space of the display device 10 inside the vehicle can be made smaller not only in the front-rear direction D1 of the vehicle but also in the orthogonal direction mentioned above.

Further, in the display device 10 according to the first embodiment of the disclosure, the guide mechanism 3 is configured to be located between two virtual planes R1 and R2 in the movement mechanism 2. Therefore, the space required for installation and operation of the guide mechanism 3 can be made still smaller in a direction orthogonal to the front-rear direction D1 of the vehicle. As a result, the occupied space of the display device 10 inside the vehicle can be made still smaller in the orthogonal direction mentioned above.

Further, in the display device 10 according to the first embodiment of the disclosure, the guide directions D21 and D22 of the display 1 based on the guide mechanism 3 are set parallel to the front-rear direction D1 of the vehicle. Therefore, the space required for guiding of the display 1 in the guide directions D21 and D22 can be reduced in a direction orthogonal to the front-rear direction D1 of the vehicle. As a result, the guide mechanism 3 can be easily downsized in the orthogonal direction mentioned above.

Further, in the display device 10 according to the first embodiment of the disclosure, the biasing portion 5 that gives a bias in the direction in which the display 1 extends along the guide direction D22 is connected to the guide mechanism 3. Therefore, the display 1 of which the distal end portion 1a is connected to the connection 21 of the movement mechanism 2 can be pulled in the extending direction mentioned above via the guide mechanism 3 to which the proximal end portion 1b of the display 1 is connected. Thereby, looseness and waviness of the display 1 can be suppressed between the connection 21 of the movement mechanism 2 and the guide mechanism 3. As a result, the movement of the display 1 in the movement directions D11 and D12 by the movement mechanism 2 and the guiding of the display 1 in the guide directions D21 and D22 by the guide mechanism 3 can be smoothly performed, and the display surface 1d of the display 1 unfolded in the vehicle interior of the vehicle can be maintained in an easily viewable state. Furthermore, the display 1 in the unfolded state can be smoothly housed into the housing space 103.

Further, in the display device 10 according to the first embodiment of the disclosure, the driver 4 that drives the movement mechanism 2 is provided. Therefore, both the movement of the display 1 in the movement directions D11 and D12 by the movement mechanism 2 and the guiding of the display 1 in the guide directions D21 and D22 by the guide mechanism 3 associated with the operation of the movement mechanism 2 can be easily performed in an automatic manner.

Further, in the display device 10 according to the first embodiment of the disclosure, the controller 9 controls the driver 4 so that the amount of unfolding A of the display 1 that is unfolded in the movement directions D11 and D12 in association with the movement of the connection 21 of the movement mechanism 2 is adjusted in accordance with the type of object-to-be-displayed information of the display 1. Therefore, of the entire display surface 1d of the display 1, a screen portion for displaying object-to-be-displayed information can be efficiently unfolded in the vehicle interior of the vehicle. Thereby, the display 1 can be caused to display the object-to-be-displayed information in an easily viewable state.

Second Embodiment

Figure 7:
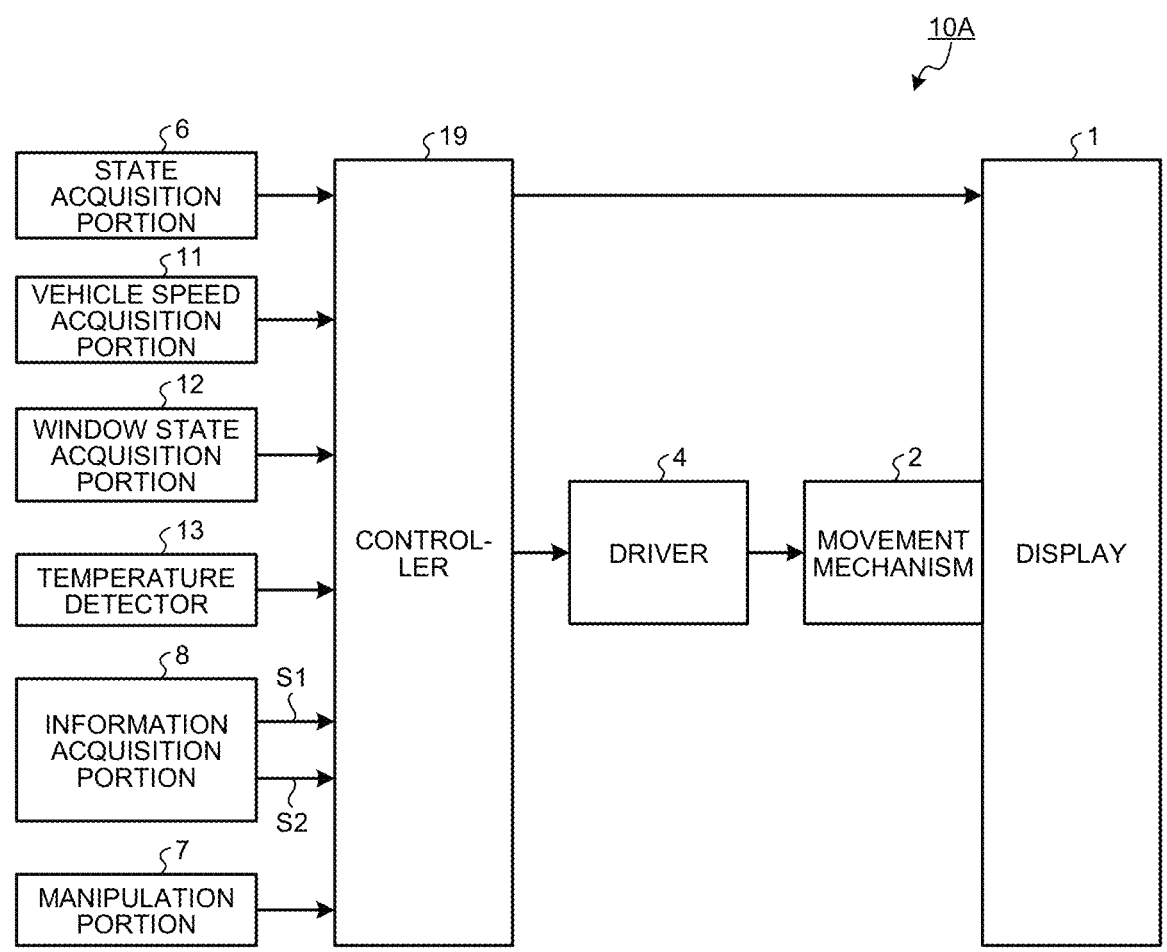
FIG. 7 is a block diagram illustrating an example of a functional configuration of a display device according to a second embodiment of the disclosure.

Next, a display device according to a second embodiment of the disclosure is described. FIG. 7 is a block diagram illustrating an example of a functional configuration of a display device according to a second embodiment of the disclosure. As illustrated in FIG. 7, a display device 10A according to the second embodiment includes a controller 19 in place of the controller 9 of the first embodiment described above, and further includes a vehicle speed acquisition portion 11, a window state acquisition portion 12, and a temperature detector 13. Otherwise, the configuration is the same as that of the first embodiment, and the same components are denoted by the same reference numerals. Although not particularly illustrated, in the second embodiment, the "vehicle" means a vehicle on which the display device 10A is mounted.

The vehicle speed acquisition portion 11 acquires the traveling speed of the vehicle on which the display device 10A is mounted. Specifically, the vehicle speed acquisition portion 11 is provided inside the vehicle, and is electrically connected to the controller 19 as illustrated in FIG. 7. Further, the vehicle speed acquisition portion 11 is connected to a measuring instrument or the like (not illustrated) that measures the traveling speed of the vehicle, and acquires the traveling speed of the vehicle continuously or intermittently on a time-series basis. Every time the vehicle speed acquisition portion 11 acquires the traveling speed of the vehicle, the vehicle speed acquisition portion 11 transmits a signal indicating the acquired traveling speed to the controller 19.

The window state acquisition portion 12 acquires the open/closed state of the window of the vehicle on which the display device 10A is mounted. Specifically, the window state acquisition portion 12 is provided inside the vehicle, and is electrically connected to the controller 19 as illustrated in FIG. 7. For example, the window state acquisition portion 12 is connected to a power window device or the like (not illustrated) that opens and closes a window of the vehicle, and acquires the open/closed state of the window of the vehicle. Specifically, the window state acquisition portion 12 acquires from the power window device, as the open/closed state of the window of the vehicle, information indicating how open the window is (the degree of opening or the like). The window state acquisition portion 12 transmits a signal indicating the information acquired from the power window device to the controller 19.

The temperature detector 13 detects the temperature of the display 1 of the display device 10A. Specifically, the temperature detector 13 is provided inside the vehicle, and is electrically connected to the controller 19 as illustrated in FIG. 7. The temperature detector 13 is formed of, for example, a thermistor, a radiation temperature sensor, or the like, and detects the temperature of the display 1 continuously or intermittently on a time-series basis. Alternatively, the temperature detector 13 may detect, as the temperature of the display 1, the temperature of an element (not illustrated) of a substrate (not illustrated) connected to the display 1. Every time the temperature detector 13 detects the temperature of the display 1, the temperature detector 13 transmits a signal indicating the detected temperature to the controller 19.

The controller 19 has a function of controlling the driver 4 in order to protect the display 1 (hereinafter, referred to as a protection control function). Specifically, the controller 19 is composed of a CPU, a memory, etc. similarly to the controller 9 of the first embodiment described above, and is provided inside the vehicle. As illustrated in FIG. 7, the controller 19 is electrically connected to components of the display device 10A, such as the display 1 and the driver 4. The controller 19 is operated by electric power supplied from a power source of the vehicle, and controls the display 1 and the driver 4.

For example, as a first example of the protection control function, the controller 19 controls the driver 4 in order to protect the display 1 from wind pressure. When the display 1 is in the unfolded state (see FIG. 2A) in the vehicle interior of the vehicle, if the vehicle is traveling with a window set to the open state, there is a fear that a strong wind may enter the vehicle interior from the window and strong wind pressure may be applied to the display 1, and consequently the display 1 may get out of order. In order to protect the display 1 from such wind pressure, the controller 19 controls the driver 4 on the basis of the traveling speed of the vehicle acquired by the vehicle speed acquisition portion 11 and the open/closed state of the window of the vehicle acquired by the window state acquisition portion 12. Specifically, when the traveling speed of the vehicle is equal to or more than a standard speed and the window of the vehicle is in the open state, the controller 19 controls the driver 4 so that the display 1 enters a state of being most extended within the movable range in the guide directions D21 and D22 (that is, the housed state).

The open/closed state of the window of the vehicle is defined on the basis of, for example, the degree of opening of the window of the vehicle. In the controller 19, a standard degree of opening serving as a standard for deciding whether the window of the vehicle is in the open state or not is set in advance. When the degree of opening is equal to or more than the standard degree of opening, the window of the vehicle is in the open state. Further, when the degree of opening is less than the standard degree of opening, the window of the vehicle is in the closed state. That is, not only when the degree of opening is zero (a completely closed state) but also when the degree of opening is less than the standard degree of opening, the window of the vehicle is regarded as being in the closed state because the influence of the wind entering from the window on the display 1 is small. The window for which the open/closed state is decided may be a window at the front seat of the vehicle, a window at the rear seat, or all of these windows.

As a second example of the protection control function, the controller 19 controls the driver 4 in order to protect the display 1 from high temperature. In the display device 10A mounted inside the vehicle, when the display 1 is in an excessively high temperature state, the display 1 may get out of order or malfunction due to high temperature heat. In order to protect the display 1 from such high temperature, the controller 19 controls the driver 4 on the basis of the temperature of the display 1 detected by the temperature detector 13. In the controller 19, a standard temperature serving as a standard for deciding the temperature of the display 1 is set in advance. The standard temperature is set on the basis of, for example, specifications such as the heat resistance of the display 1. When the temperature of the display 1 detected by the temperature detector 13 is equal to or more than the standard temperature, the controller 19 controls the driver 4 so that the display 1 enters a state of being unfolded in the movement directions D11 and D12 (for example, the fully unfolded state). Further, when the temperature of the display 1 in the partially unfolded state is equal to or more than the standard temperature, the controller 19 controls the display 1 to turn off the display of object-to-be-displayed information, and controls the driver 4 so that the display 1 changes from the partially unfolded state to the fully unfolded state. Note that the controller 19 may control the driver 4 so that the display 1 changes from the partially unfolded state to the fully unfolded state while keeping the display 1 displaying object-to-be-displayed information.

The controller 19 has a control function similar to that of the controller 9 in the first embodiment described above except for the protection control function of the first example and the second example. That is, like in the first embodiment described above, the controller 19 has a function of controlling the driver 4 in order to adjust the amount of unfolding A (see FIG. 2A) of the display 1 in accordance with the type of object-to-be-displayed information and a control function of causing the display 1 to display object-to-be-displayed information.

Figure 8:
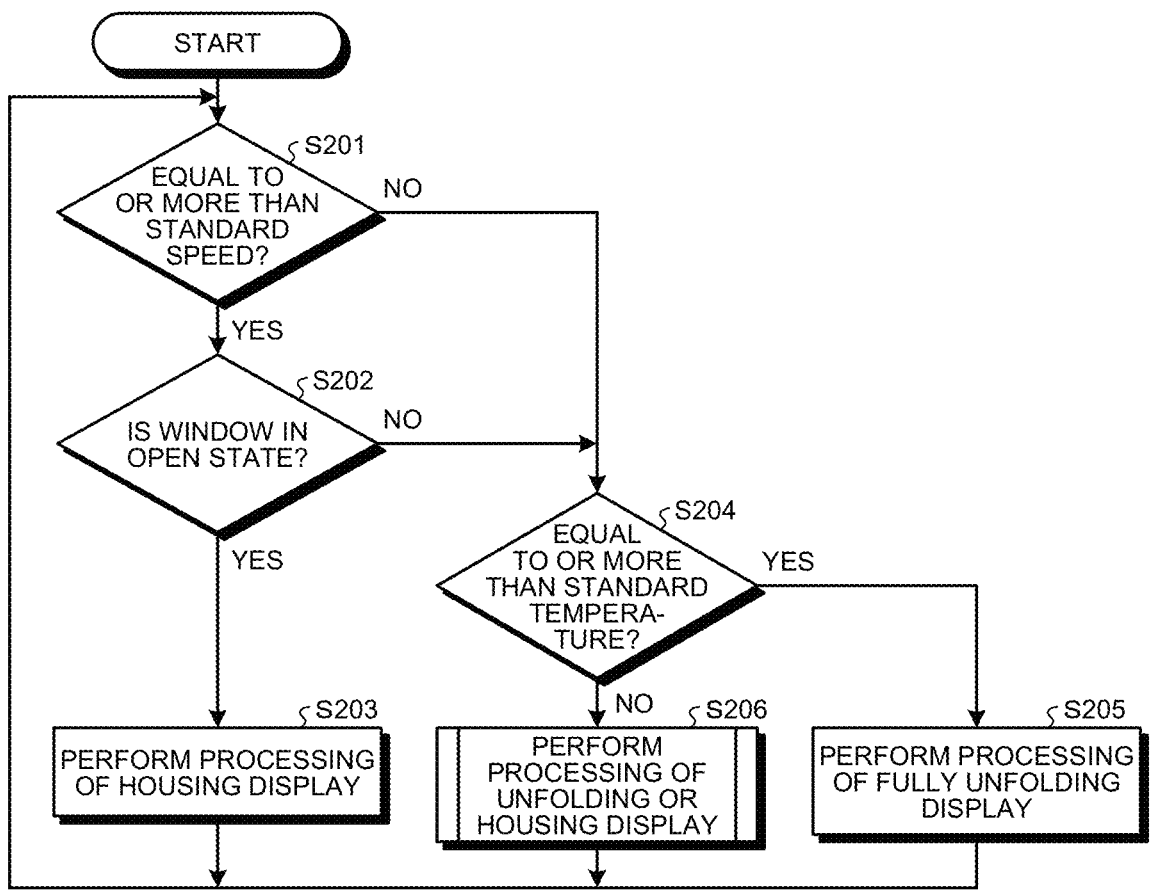
FIG. 8 is a flowchart illustrating an example of an operation of the display device according to the second embodiment of the disclosure.

Next, an operation of the display device 10A regarding the unfolding or housing of the display 1 in the second embodiment is described. FIG. 8 is a flowchart illustrating an example of an operation of the display device according to the second embodiment of the disclosure. In the second embodiment, the display device 10A is activated by being supplied with electric power from a power source of the vehicle, and then appropriately performs the pieces of processing of steps S201 to S206 illustrated in FIG. 8. Thereby, while protecting the display 1 from wind pressure or high temperature, the display device 10A unfolds or houses the display 1 while adjusting the amount of unfolding A of the display 1 in accordance with the type of object-to-be-displayed information.

Specifically, as illustrated in FIG. 8, the display device 10A decides whether the traveling speed of the vehicle is equal to or more than a standard speed or not (step S201). In step S201, the controller 19 acquires a signal from the vehicle speed acquisition portion 11. In the controller 19, a standard speed serving as a standard for deciding the traveling speed is set in advance. The standard speed is set on the basis of, for example, a relationship between the wind pressure applied to the display 1 in the unfolded state of the display device 10A and the traveling speed when the vehicle is traveling with a window set to the open state, etc. The controller 19 compares the traveling speed indicated by the signal from the vehicle speed acquisition portion 11 and the standard speed, and thereby decides whether the traveling speed of the vehicle is equal to or more than the standard speed or not.

In the case where in step S201 the traveling speed of the vehicle is equal to or more than the standard speed (step S201: Yes), the display device 10A decides whether the window of the vehicle is in the open state or not (step S202). In step S202, the controller 19 acquires a signal from the window state acquisition portion 12. The controller 19 compares the degree of opening of the window indicated by the signal acquired from the window state acquisition portion 12 and a standard degree of opening. Then, in the case where the acquired degree of opening of the window is equal to or more than the standard degree of opening, the controller 19 decides that the window is in the open state, and in the case where the acquired degree of opening of the window is less than the standard degree of opening, the controller 19 decides that the window is in the closed state.

In the case where in step S202 the window of the vehicle is in the open state (step S202: Yes), at least one of all the windows of the vehicle is in the open state. There is a fear that a strong wind according to the traveling speed equal to or more than the standard speed may enter the vehicle interior of the vehicle from the window in the open state and consequently excessive wind pressure may be applied to the display 1 in the unfolded state. In this case, the display device 10A executes the processing of housing the display 1 (step S203). In step S203, like in step S108 (see FIG. 6) in the first embodiment described above, the controller 19 controls the driver 4 so that the display 1 in the unfolded state is housed into the housing space 103. Thereby, the display device 10A protects the display 1 from excessive wind pressure, and prevents a failure of the display 1 due to wind pressure. After the execution of step S203, the display device 10A returns to step S201 described above, and repeats the processing of step S201 and subsequent steps.

On the other hand, in the case where in step S201 the traveling speed of the vehicle is less than the standard speed (step S201: No), even if the window is in the open state, a strong wind that applies excessive wind pressure to the display 1 in the unfolded state does not enter the vehicle interior of the vehicle. Further, in the case where in step S202 the window (for example, all the windows) of the vehicle is in the closed state (step S202: No), even if the vehicle is traveling at a vehicle speed equal to or more than the standard speed, a strong wind does not enter the vehicle interior of the vehicle. In such a situation, the display device 10A decides whether the temperature of the display 1 is equal to or more than a predetermined temperature or not (step S204).

In step S204, the controller 19 acquires a signal from the temperature detector 13. The controller 19 compares the temperature of the display 1 indicated by the signal from the temperature detector 13 and the standard temperature, and thereby decides whether the temperature of the display 1 is equal to or more than the standard temperature or not.

In the case where in step S204 the temperature of the display 1 is equal to or more than the standard temperature (step S204: Yes), there is a fear that the display 1 may be in an excessively high temperature state and a failure or malfunction may be caused. In this case, the display device 10A executes the processing of fully unfolding the display 1 (step S205). In step S205, like in step S102 (see FIG. 6) in the first embodiment described above, the controller 19 controls the driver 4 to bring the display 1 into the fully unfolded state in the vehicle interior of the vehicle. Thereby, the display 1 is changed from the housed state or the partially unfolded state to the fully unfolded state, and heat is released from the display 1. At this time, the controller 19 may turn off the display of the display 1 in the partially unfolded state and bring the display 1 into the fully unfolded state, or may bring the display 1 in the partially unfolded state into the fully unfolded state without turning off the display of the display 1. By thus performing heat dissipation of the display 1, the display device 10A protects the display 1 from excessive high temperature, and prevents a failure or malfunction of the display 1 due to high heat. After the execution of step S205, the display device 10A returns to step S201 described above, and repeats the processing of step S201 and subsequent steps.

On the other hand, in the case where in step S204 the temperature of the display 1 is less than the standard temperature (step S204: No), the display device 10A executes the processing of unfolding or housing the display 1 so that, like in the first embodiment described above, the display 1 is caused to appropriately display object-to-be-displayed information while the amount of unfolding A of the display 1 is adjusted in accordance with the type of the object-to-be-displayed information (step S206). In step S206, the controller 19 appropriately executes pieces of processing similar to those of steps S101 to S108 illustrated in FIG. 6. Then, in the case where in step S105 the display 1 is in the housed state, in the case where in step S107 the power source of the vehicle is in the on state, or in the case where the housing processing of step S108 is executed, the controller 19 returns from step S206 illustrated in FIG. 8 to step S201 described above. After that, the display device 10A repeats the processing of step S201 and subsequent steps.

As described hereinabove, in the display device 10A according to the second embodiment of the disclosure, design is made such that when the traveling speed of the vehicle is equal to or more than a standard speed and the window of the vehicle is in the open state, the controller 19 controls the driver 4 so that the display 1 enters a state of being most extended within the movable range in the guide directions D21 and D22 (that is, the housed state), and otherwise the configuration is set similar to that of the first embodiment. Therefore, similar actions and effects to those of the first embodiment described above can be enjoyed, and the display 1 can be housed into the housing space 103 before excessive wind pressure is applied to the display 1 in the unfolded state in the vehicle interior of the vehicle. Thereby, the display 1 can be protected from wind pressure due to a strong wind that has entered the vehicle interior from the window of the traveling vehicle, and as a result a failure of the display 1 due to wind pressure can be prevented.

Further, the display device 10A according to the second embodiment of the disclosure is configured such that the temperature of the display 1 is detected by the temperature detector 13, and when the detected temperature of the display 1 is equal to or more than a standard temperature, the controller 19 controls the driver 4 so that the display 1 enters a state of being unfolded in the movement directions D11 and D12 (for example, the fully unfolded state). Therefore, before the display 1 of the display device 10A mounted inside the vehicle enters an excessively high temperature state, the display 1 can be brought into the unfolded state to release heat from the display 1. Thereby, the display 1 can be protected from high temperature, and as a result a failure and a malfunction of the display 1 due to high temperature heat can be prevented.

Third Embodiment

Figure 9:
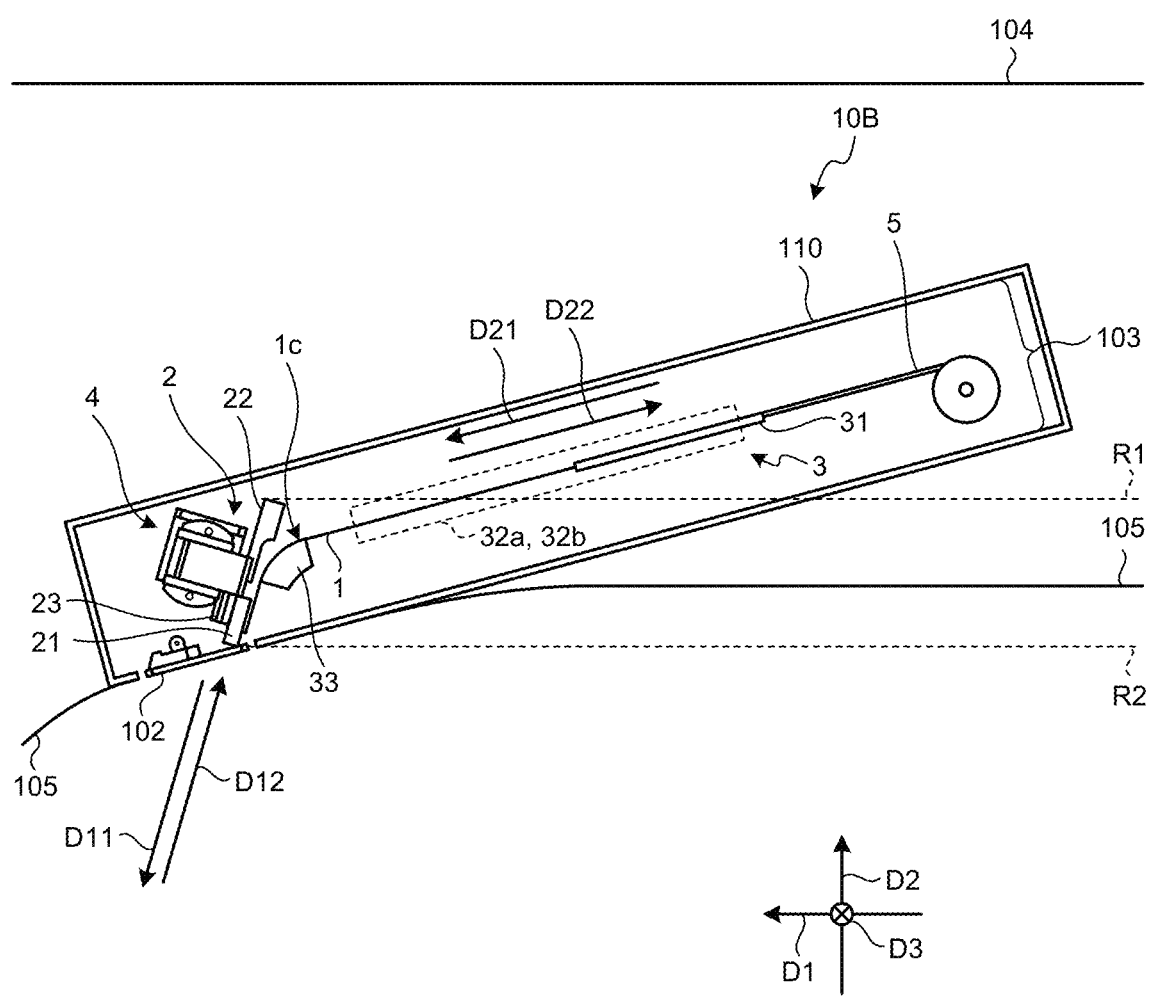
FIG. 9 is a side view illustrating a configuration example of a display device according to a third embodiment of the disclosure.

Next, a display device according to a third embodiment of the disclosure is described. FIG. 9 is a side view illustrating a configuration example of a display device according to a third embodiment of the disclosure. As illustrated in FIG. 9, a display device 10B according to the third embodiment further includes a casing 110, and is provided inside the ceiling of the vehicle in a state of being inclined with respect to the front-rear direction D1 of the vehicle. Otherwise, the configuration is the same as that of the first embodiment or the second embodiment, and the same components are denoted by the same reference numerals. Although not particularly illustrated, in the third embodiment, the "vehicle" means a vehicle on which the display device 10B is mounted.

As illustrated in FIG. 9, for example, the casing 110 is formed in a rectangular shape in a side view viewed from the left-right direction D3, and accommodates components of the display device 10B, such as the display 1, the movement mechanism 2, the guide mechanism 3, the driver 4, and the biasing portion 5. Further, in the casing 110, an opening serving as an entrance/exit port of the display 1 is formed, and an opening/closing panel 102 is provided in the opening. In the third embodiment, the opening/closing panel 102 is axially supported at the casing 110 in a freely rotationally movable manner so as to be able to open and close the opening of the casing 110. Such a casing 110 is provided between the ceiling 104 and the lining 105 of the vehicle such that the opening/closing panel 102 is located within the range of the opening formed in the lining 105. At this time, the casing 110 is, for example, inclined with respect to the front-rear direction D1 of the vehicle along the lining 105 formed in a partially curved shape. The casing 110 is not limited to the rectangular shape illustrated in FIG. 9, and may be formed in a shape other than the rectangular shape in accordance with the placement of the display device 10B inside the ceiling of the vehicle, etc.

The display device 10B including the casing 110 like the above brings the opening/closing panel 102 into the open state like in the cases of the first and second embodiments, and unfolds the display 1 from the inside of the casing 110 into the vehicle interior of the vehicle. Further, the display device 10B houses the display 1 from the vehicle interior of the vehicle into the casing 110, and brings the opening/closing panel 102 into the closed state like in the cases of the first and second embodiments. That is, in the third embodiment, the housing space 103 of the display 1 is formed inside the casing 110 as illustrated in FIG. 9.

As illustrated in FIG. 9, the movement directions D11 and D12 of the connection 21 of the movement mechanism 2 in the third embodiment are directions inclined with respect to the front-rear direction D1 and the up-down direction D2 of the vehicle. The guide mechanism 3 in the third embodiment is in a state of being inclined with respect to the front-rear direction D1 of the vehicle in correspondence with the inclined state of the casing 110. That is, the guide directions D21 and D22 of the guide mechanism 3 are not only directions different from the movement directions D11 and D12 of the movement mechanism 2, but also directions inclined with respect to the front-rear direction D1 and the up-down direction D2 of the vehicle.

The guide mechanism 3 in a state of being thus inclined is in a state where a portion thereof is deviated from between the two virtual planes R1 and R2. For example, as illustrated in FIG. 9, in the guide mechanism 3, at least part of the connection plate 31 and the guide rails 32a and 32b are located outside between the two virtual planes R1 and R2. The support 33 is located between the two virtual planes R1 and R2. That is, in the third embodiment, the curved portion 1c of the display 1 is located between the two virtual planes R1 and R2. Further, as illustrated in FIG. 9, the biasing portion 5 in the third embodiment is located outside between the two virtual planes R1 and R2.

As described hereinabove, in the third embodiment of the disclosure, components of the display device 10B are accommodated inside the casing 110 and the display device 10B is placed such that the guide directions D21 and D22 of the guide mechanism 3 are inclined with respect to the front-rear direction D1 of the vehicle, and otherwise the configuration is set similar to that of the first embodiment or the second embodiment. Therefore, the display 1 can be unfolded and housed like in the first embodiment or the second embodiment described above, and even though at least part of the guide mechanism 3 is located outside between the two virtual planes R1 and R2, the space required for installation and operation of the movement mechanism 2 can be reduced in the front-rear direction D1 of the vehicle like in the first and second embodiments; thus, the occupied space of the display device 10B inside the vehicle can be made smaller.

Fourth Embodiment

Figure 10:
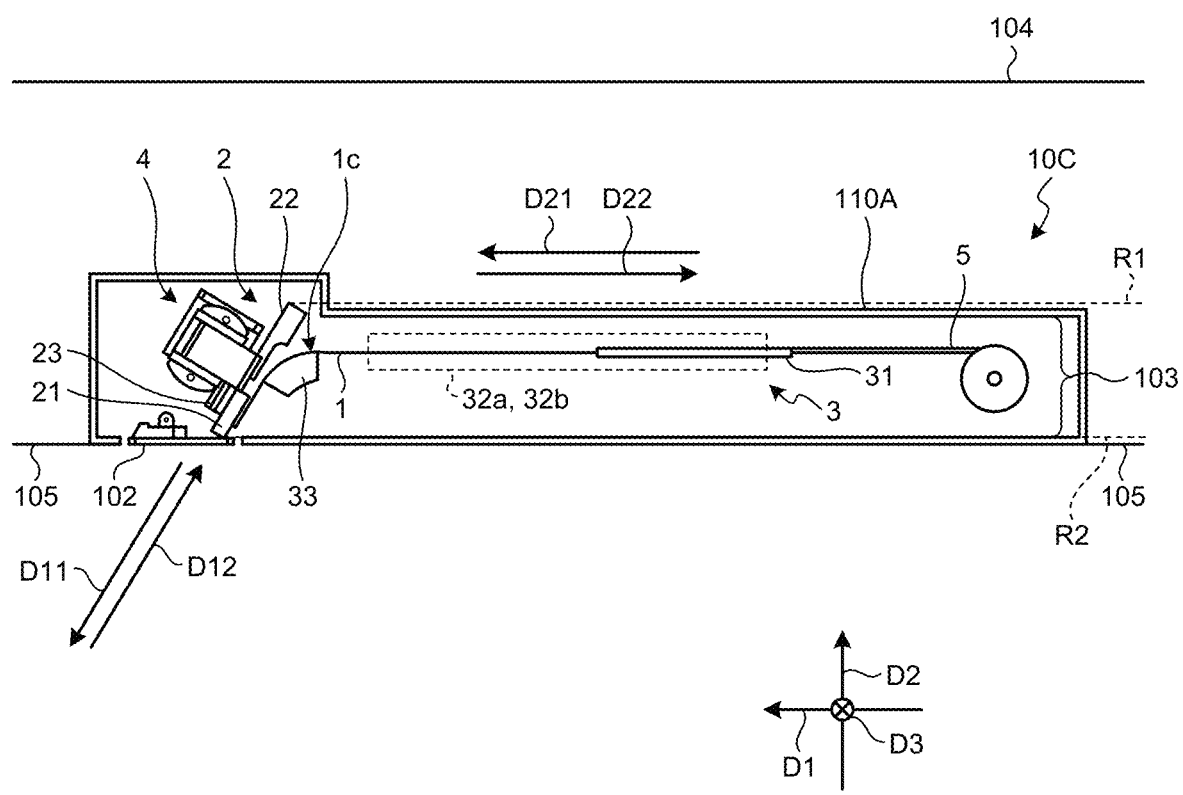
FIG. 10 is a side view illustrating a configuration example of a display device according to a fourth embodiment of the disclosure.

Next, a display device according to a fourth embodiment of the disclosure is described. FIG. 10 is a side view illustrating a configuration example of a display device according to a fourth embodiment of the disclosure. As illustrated in FIG. 10, a display device 10C according to the fourth embodiment includes a casing 110A in place of the casing 110 of the display device 10B according to the third embodiment described above, and is provided inside the ceiling of the vehicle in a state of being parallel to the front-rear direction D1 of the vehicle. Otherwise, the configuration is the same as that of the third embodiment, and the same components are denoted by the same reference numerals. That is, the display device 10C is similar to a display device in which the casing 110A is added to the display device 10 according to the first embodiment described above or the display device 10A according to the second embodiment. Although not particularly illustrated, in the fourth embodiment, the "vehicle" means a vehicle on which the display device 10C is mounted.

As illustrated in FIG. 10, the casing 110A is formed in a shape in which a part of the casing 110 (see FIG. 9) in the third embodiment described above protrudes, and accommodates components of the display device 10C, such as the display 1, the movement mechanism 2, the guide mechanism 3, the driver 4, and the biasing portion 5. For example, the casing 110A has a structure in which a portion that accommodates the movement mechanism 2 and the driver 4 among the above components protrudes upward in the up-down direction D2. The casing 110A is provided with the opening/closing panel 102 similarly to the casing 110 in the third embodiment. The opening/closing panel 102 of the casing 110A is located within the range of the opening formed in the lining 105. As illustrated in FIG. 10, such a casing 110A is provided between the ceiling 104 and the lining 105 of the vehicle in a state of being parallel to the front-rear direction D1 of the vehicle. The casing 110A is not limited to the partially protruding shape illustrated in FIG. 10, and may be formed in a shape other than the above shape in accordance with the placement of the display device 10C inside the ceiling of the vehicle, etc.

The display device 10C including the casing 110A like the above opens or closes the opening/closing panel 102 to unfold or house the display 1 like in the case of the third embodiment. That is, in the fourth embodiment, the housing space 103 of the display 1 is formed inside the casing 110A as illustrated in FIG. 10.

As illustrated in FIG. 10, the movement directions D11 and D12 of the movement mechanism 2 and the guide directions D21 and D22 of the guide mechanism 3 in the fourth embodiment are similar to those of the first and second embodiments described above. The guide mechanism 3 in the fourth embodiment is located between the two virtual planes R1 and R2 like in the first and second embodiments described above.

As described hereinabove, in the fourth embodiment of the disclosure, components of the display device 10C are accommodated inside the casing 110A in a partially protruding shape and the casing 110A is placed such that the guide directions D21 and D22 of the guide mechanism 3 are parallel to the front-rear direction D1 of the vehicle, and otherwise the configuration is set similar to that of the first embodiment or the second embodiment. Therefore, the display 1 can be unfolded and housed like in the first embodiment or the second embodiment described above, and even in a configuration in which components of the display device 10C are accommodated inside the casing 110A, the space required for installation and operation of the movement mechanism 2 can be reduced in the front-rear direction D1 of the vehicle like in the first and second embodiments; thus, the occupied space of the display device 10C inside the vehicle can be made smaller.

Fifth Embodiment

Figure 11:
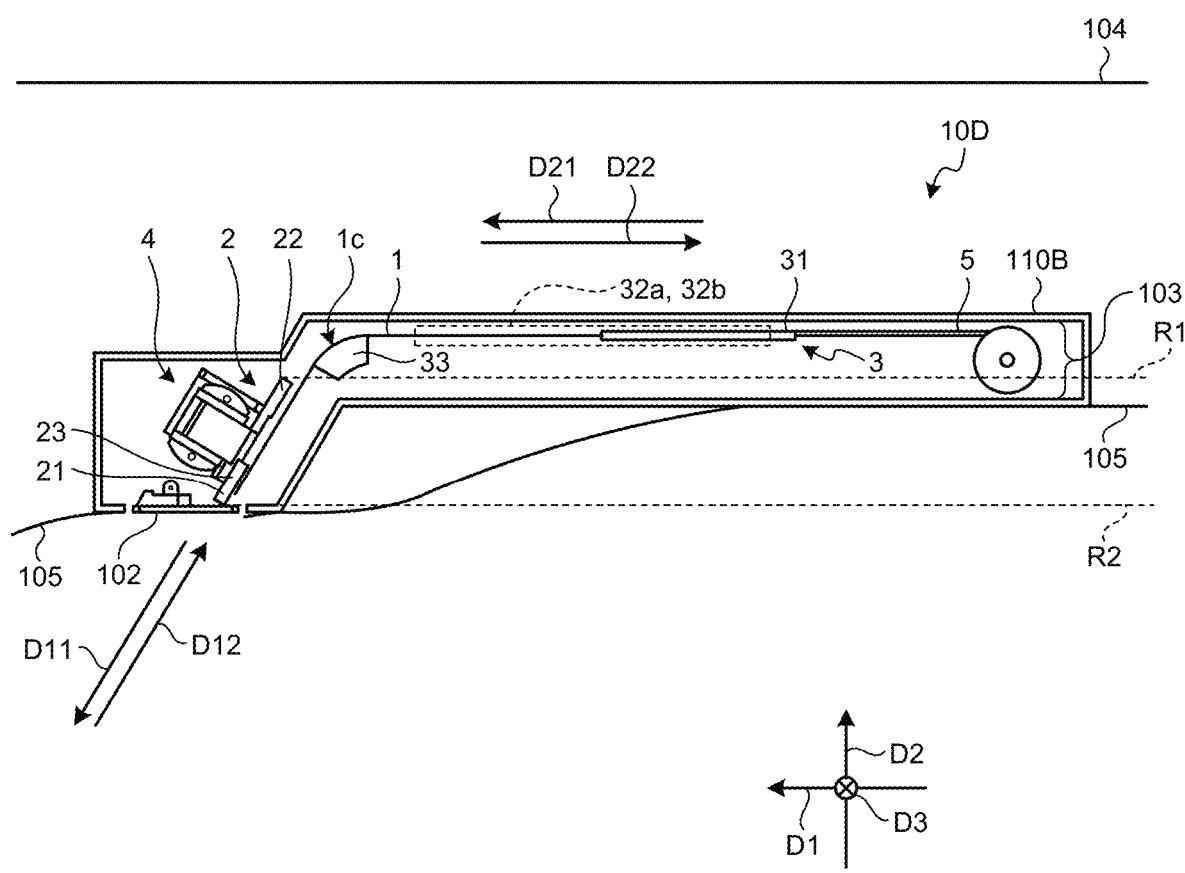
FIG. 11 is a side view illustrating a configuration example of a display device according to a fifth embodiment of the disclosure.

Next, a display device according to a fifth embodiment of the disclosure is described. FIG. 11 is a side view illustrating a configuration example of a display device according to a fifth embodiment of the disclosure. As illustrated in FIG. 11, a display device 10D according to the fifth embodiment includes a casing 110B in place of the casing 110A of the display device 10C according to the fourth embodiment described above, and is configured such that the curved portion 1c of the display 1 is located outside between the two virtual planes R1 and R2. Otherwise, the configuration is the same as that of the fourth embodiment, and the same components are denoted by the same reference numerals. Although not particularly illustrated, in the fifth embodiment, the "vehicle" means a vehicle on which the display device 10D is mounted.

As illustrated in FIG. 11, the casing 110B accommodates components of the display device 10D, such as the display 1, the movement mechanism 2, the guide mechanism 3, the driver 4, and the biasing portion 5, and is, for example, formed in a shape having a step between a first portion accommodating the movement mechanism 2 and the driver 4 and a second portion accommodating the guide mechanism 3 and the biasing portion 5. Like in the casing 110B in the fourth embodiment, the opening/closing panel 102 is provided in the first portion of the casing 110B. The opening/closing panel 102 of the casing 110B is located within the range of the opening formed in the lining 105. As illustrated in FIG. 11, such a casing 110B is provided between the ceiling 104 and the lining 105 of the vehicle along the lining 105 having a partial step. At this time, the casing 110B is placed such that the step of the lining 105 is absorbed by the step between the first portion and the second portion. The casing 110B is not limited to a stepped shape like that illustrated in FIG. 11, and may be formed in a shape other than the stepped shape, such as a rectangular shape, in accordance with the placement of the display device 10D inside the ceiling of the vehicle, etc.

The display device 10D including the casing 110B like the above opens or closes the opening/closing panel 102 to unfold or house the display 1 like in the case of the fourth embodiment. That is, in the fifth embodiment, the housing space 103 of the display 1 is formed inside the casing 110B as illustrated in FIG. 11.

Further, in the fifth embodiment, the guide mechanism 3 is provided inside the casing 110B such that the curved portion 1c of the display 1 is located outside between the two virtual planes R1 and R2. For example, as illustrated in FIG. 11, the connection plate 31, the guide rails 32a and 32b, and the support 33 of the guide mechanism 3 are placed in positions deviated upward from between the two virtual planes R1 and R2. Due to the placement of the support 33, the curved portion 1c of the display 1 is located outside (outside on the upper side) between the two virtual planes R1 and R2. Further, the biasing portion 5 in the fifth embodiment is located outside between the two virtual planes R1 and R2 similarly to the guide mechanism 3 illustrated in FIG. 11.

The guide directions D21 and D22 of such a guide mechanism 3 in the fifth embodiment are parallel to the front-rear direction D1 of the vehicle like in the first and second embodiments described above. The movement directions D11 and D12 of the movement mechanism 2 in the fifth embodiment are similar to those of the first and second embodiments described above.

As described hereinabove, in the fifth embodiment of the disclosure, components of the display device 10D are accommodated inside the casing 110B in a step shape and the guide mechanism 3 is configured such that the curved portion 1c of the display 1 is located outside between the two virtual planes R1 and R2, and otherwise the configuration is set similar to that of the fourth embodiment. Therefore, the display 1 can be unfolded and housed like in the first embodiment or the second embodiment described above, and even though the curved portion 1c of the display 1 is not accommodated between the two virtual planes R1 and R2, the space required for installation and operation of the movement mechanism 2 can be reduced in the front-rear direction D1 of the vehicle like in the first and second embodiments; thus, the occupied space of the display device 10D inside the vehicle can be made smaller.

Sixth Embodiment

Next, a display device according to a sixth embodiment of the disclosure is described. FIG. 12 is a side view illustrating a configuration example of a display device according to a sixth embodiment of the disclosure. FIG. 13 is a schematic diagram illustrating an example of a state where the display device according to the sixth embodiment of the disclosure is mounted on a vehicle. As illustrated in FIGS. 12 and 13, a display device 10E according to the sixth embodiment is provided inside an instrument panel 106 on the front side of the vehicle so as to function as, not a rear monitor given as an example in the first to fifth embodiments described above, but a monitor on the front side in which the display 1 is put in and taken out of the instrument panel 106. Otherwise, the configuration is the same as that of the fifth embodiment, and the same components are denoted by the same reference numerals. Although not particularly illustrated, in the sixth embodiment, the "vehicle" means a vehicle on which the display device 10E is mounted.

Specifically, as illustrated in FIGS. 12 and 13, the display device 10E is placed inside the instrument panel 106 such that the opening/closing panel 102 attached to the casing 110B faces upward, and is provided such that the opening/closing panel 102 is located within the range of the opening formed in the instrument panel 106. At this time, the display device 10E is, for example, in a state of being inclined with respect to the front-rear direction D1 of the vehicle along the inner wall of the instrument panel 106.

Such a display device 10E is configured to function as a monitor on the front side in the vehicle. Specifically, the display device 10E brings the opening/closing panel 102 into the open state like in the cases of the first and second embodiments, and takes out the display 1 from the inside of the casing 110B to the side of a windshield 107 of the vehicle; thereby, unfolds the display 1 into the vehicle interior of the vehicle (see FIG. 13). Further, the display device 10E houses the display 1 from the vehicle interior of the vehicle into the casing 110B, and brings the opening/closing panel 102 into the closed state like in the cases of the first and second embodiments (see FIG. 12).

As illustrated in FIG. 12, the movement directions D11 and D12 of the connection 21 of the movement mechanism 2 in the sixth embodiment are directions inclined with respect to the front-rear direction D1 and the up-down direction D2 of the vehicle. Of such movement directions D11 and D12, the movement direction D11 when unfolding the display 1 is an obliquely upward direction, and the movement direction D12 when housing the display 1 is an obliquely downward direction. The guide mechanism 3 in the sixth embodiment is in a state of being inclined with respect to the front-rear direction D1 of the vehicle in correspondence with the inclined state of the casing 110B. That is, the guide directions D21 and D22 of the guide mechanism 3 are not only directions different from the movement directions D11 and D12 of the movement mechanism 2, but also directions inclined with respect to the front-rear direction D1 and the up-down direction D2 of the vehicle. Of such guide directions D21 and D22, the guide direction D21 when unfolding the display 1 is an obliquely upward direction, and the guide direction D22 when housing the display 1 is an obliquely downward direction.

In the sixth embodiment, the upper virtual plane R1 of the two virtual planes R1 and R2 is, as illustrated in FIG. 12, a plane that passes through an upper end portion of the connection 21 of the movement mechanism 2 and is parallel to the front-rear direction D1 of the vehicle. The lower virtual plane R2 is, as illustrated in FIG. 12, a plane that passes through a lower end portion of the fixed portion 22 of the movement mechanism 2 and is parallel to the front-rear direction D1 of the vehicle. The guide mechanism 3 in the sixth embodiment is configured such that the curved portion 1c of the display 1 is located outside between the two virtual planes R1 and R2. For example, as illustrated in FIG. 12, the connection plate 31, the guide rails 32a and 32b, and the support 33 of the guide mechanism 3 are placed in positions deviated downward from between the two virtual planes R1 and R2. Due to the placement of the support 33, the curved portion 1c of the display 1 is located outside (outside on the lower side) between the two virtual planes R1 and R2. The biasing portion 5 in the sixth embodiment is located outside between the two virtual planes R1 and R2 similarly to the guide mechanism 3 illustrated in FIG. 12.

Figure 14:
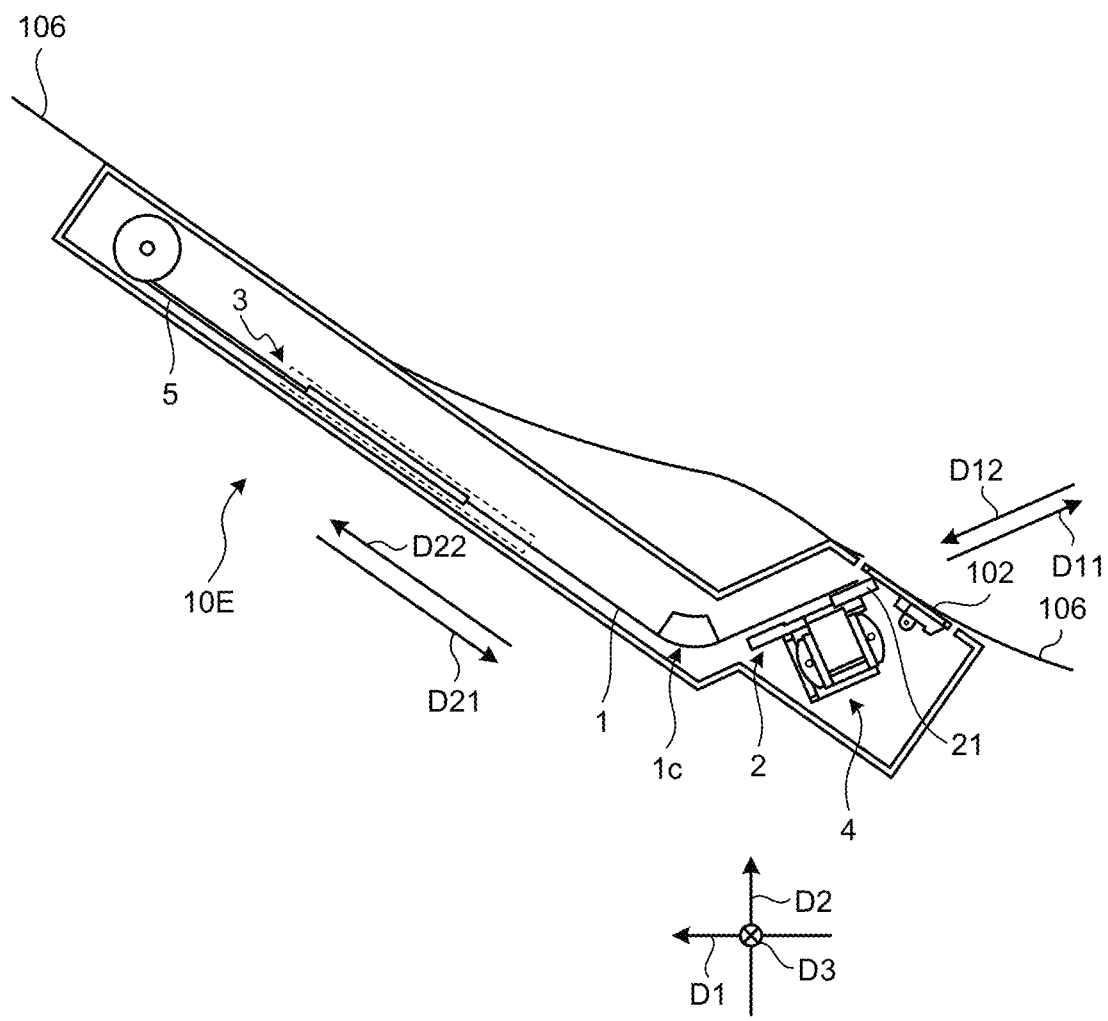
FIG. 14 is a side view illustrating a first modification example of the display device according to the sixth embodiment of the disclosure.
Figure 15:
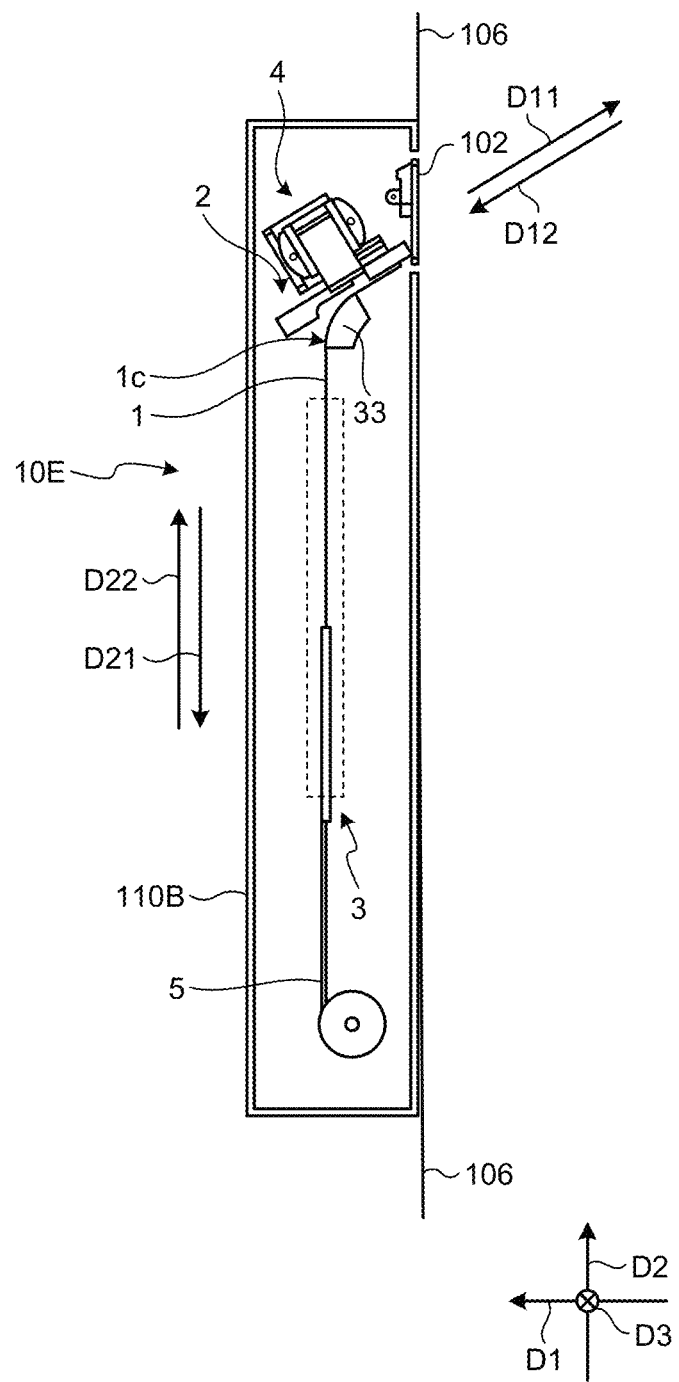
FIG. 15 is a side view illustrating a second modification example of the display device according to the sixth embodiment of the disclosure.

The placement of the display device 10E inside the instrument panel 106 is not limited to a placement like that illustrated in FIG. 12 in which the movement mechanism 2 is located above the guide mechanism 3. FIG. 14 is a side view illustrating a first modification example of the display device according to the sixth embodiment of the disclosure. As illustrated in FIG. 14, the display device 10E according to the sixth embodiment may be placed inside the instrument panel 106 such that the movement mechanism 2 is located below the guide mechanism 3. FIG. 15 is a side view illustrating a second modification example of the display device according to the sixth embodiment of the disclosure. As illustrated in FIG. 15, the display device 10E according to the sixth embodiment may be placed inside the instrument panel 106 such that the guide directions D21 and D22 of the guide mechanism 3 are parallel to the up-down direction D2 of the vehicle. At this time, the movement mechanism 2 may be located above the guide mechanism 3 as illustrated in FIG. 15, or may be located below the guide mechanism 3 conversely to the case illustrated in FIG. 15.

Further, in the sixth embodiment, the casing 110B may be formed in a stepped shape as illustrated in FIGS. 12 and 14, or may be formed in a rectangular shape free without a step as illustrated in FIG. 15. Alternatively, the casing 110B may be formed in a shape other than the above in accordance with the placement of the display device 10E inside the instrument panel 106, etc.

As described hereinabove, in the sixth embodiment of the disclosure, the display device 10E is provided inside the instrument panel 106 and the display device 10E is made to function as a monitor on the front side in the vehicle interior of the vehicle, and otherwise the configuration is set similar to that of the fifth embodiment. Therefore, the display 1 can be unfolded and housed like in the first embodiment or the second embodiment described above, and even though the display device 10E is configured as a monitor on the front side, the space required for installation and operation of the movement mechanism 2 can be reduced in the front-rear direction D1 of the vehicle like in the first and second embodiments; thus, the occupied space of the display device 10E inside the vehicle can be made smaller.

Although the first to sixth embodiments described above show, as an example, a movement mechanism 2 in which the connection 21 moves in the movement directions D11 and D12 inclined with respect to the front-rear direction D1 of the vehicle, the disclosure is not limited thereto. In the disclosure, the movement directions D11 and D12 of the connection 21 in the movement mechanism 2 need only to be directions intersecting the front-rear direction D1 of the vehicle, and may be, for example, directions orthogonal to the front-rear direction D1. Further, each of the movement directions D11 and D12 may be a direction in which the connection 21 moves (moves up or down) toward the upper side or the lower side of the vehicle, or may be a direction in which the connection 21 moves toward the right side or the left side of the vehicle.

Further, although the first to fifth embodiments described above show, as an example, a case where the display 1 enters the unfolded state as the connection 21 of the movement mechanism 2 moves to the lower side of the vehicle and the sixth embodiment described above shows, as an example, a case where the display 1 enters the unfolded state as the connection 21 of the movement mechanism 2 moves to the upper side of the vehicle, the disclosure is not limited thereto. For example, the display 1 may be one that enters the unfolded state as the connection 21 moves to the upper side or the lower side of the vehicle, or may one that enters the unfolded state as the connection 21 moves to one side in the left-right direction D3 (the right side or the left side) of the vehicle.

Further, although the first to sixth embodiments described above show, as an example, a pantograph-type movement mechanism 2 including the link 23, the disclosure is not limited thereto. For example, the movement mechanism 2 may be a type other than a pantograph type, such as a rack and pinion type including a rack that moves the connection 21 in the movement direction D11 or D12 in association with the rotation of a pinion gear.

Further, although the first to sixth embodiments described above show, as an example, a movement mechanism 2 in which the connection 21 moves in the movement directions D11 and D12 by the driving force of the driver 4, the disclosure is not limited thereto. For example, the movement mechanism 2 may be one in which the connection 21 manually moves in the movement directions D11 and D12. In this case, the display devices 10, 10A, 10B, 10C, 10D, and 10E may not include the driver 4. Further, in the case where the driver 4 is not provided, each of the display devices 10, 10A, 10B, 10C, 10D, and 10E may include a lock mechanism that locks the operation of the movement mechanism 2, and may be configured such that when the lock of the movement mechanism 2 based on the lock mechanism is released, the display 1 is unfolded by its own weight or the weight of the connection 21 of the movement mechanism 2. Alternatively, each of the display devices 10, 10A, 10B, 10C, 10D, and 10E may further include an elastic member such as a spring that gives a bias in the unfolding direction of the display 1 (the movement direction D11 illustrated in FIG. 2A), and may be configured such that when the lock of the movement mechanism 2 based on the lock mechanism is released, the display 1 is unfolded by the biasing force of the elastic member.

Further, although the first to sixth embodiments described above show, as an example, a case where the driver 4 is provided on the fixed portion 22 of the movement mechanism 2, the disclosure is not limited thereto. In the disclosure, the driver 4 may be provided in a place other than the movement mechanism 2 in each of the display devices 10, 10A, 10B, 10C, 10D, and 10E.

Further, although the first to sixth embodiments described above show, as an example, a driver 4 that drives the movement mechanism 2, the disclosure is not limited thereto. In the disclosure, the driver 4 may be one that drives the guide mechanism 3; for example, may be one that drives the connection plate 31 of the guide mechanism 3 to slide it in the guide directions D21 and D22.

Further, although the first to sixth embodiments described above show, as an example, a driver 4 having a drive shaft in a direction orthogonal to the movement directions D11 and D12 of the connection 21 of the movement mechanism 2, the disclosure is not limited thereto. In the disclosure, the driver 4 may be one that has a drive shaft in a direction parallel to the movement directions D11 and D12. For example, the driver 4 may be one that has a drive shaft such as the ball screw 42 that operates the bracket 43 in a direction orthogonal to the movement directions D11 and D12, or may be one that has a rack that operates in a direction parallel to the movement directions D11 and D12 and a pinion gear that operates the rack. Further, the driver 4 may be one that has, as well as the drive shafts described above, a drive mechanism including a drive component such as a belt or a trapezoidal screw thread.

Further, although the first to sixth embodiments described above show, as an example, a biasing portion 5 formed of a spiral torsion spring, the disclosure is not limited thereto. In the disclosure, the biasing portion 5 may be formed of an elastic member other than a spiral torsion spring, for example, a leaf spring, a coil spring, rubber, a wire, or the like. Alternatively, the display devices 10, 10A, 10B, 10C, 10D, and 10E may not include the biasing portion 5.

Further, although the first to sixth embodiments described above show a rear monitor or a monitor on the front side of a vehicle as a practical example of the display devices 10, 10A, 10B, 10C, 10D, and 10E, the disclosure is not limited thereto. Each of the display devices 10, 10A, 10B, 10C, 10D, and 10E according to the disclosure may be used as a display device other than a rear monitor or a monitor on the front side of a vehicle, for example, a display device such as a front seat-side monitor, an overhead module, or an electronic inner mirror.

Further, although the first and second embodiments described above show, as an example, a case where the housing space 103 of each of the display devices 10 and 10A is inside the ceiling of the vehicle, the disclosure is not limited thereto. In the disclosure, the housing space 103 of each of the display devices 10 and 10A may be formed in a place other than inside the ceiling of the vehicle, for example, inside a dashboard, inside an instrument panel, inside a console box, in an inside portion of a door, or the like.

Although in the third to sixth embodiments described above the housing space 103 is formed inside the casing 110, 110A, or 110B of the display device 10B, 10C, 10D, or 10E provided inside the ceiling of the vehicle or inside the instrument panel, the disclosure is not limited thereto. In the disclosure, the casing 110, 110A, or 110B forming the housing space 103 may be provided in a place other than inside the ceiling of the vehicle or inside the instrument panel, for example, inside a dashboard, inside a console box, in an inside portion of a door, or the like.

Further, although the first and second embodiments described above the driver 4 is controlled such that when the vehicle moves rearward, that is, when the shift lever of the vehicle is switched to the position corresponding to rearward (R: reverse), the display 1 is brought into the housed state, the disclosure is not limited thereto. For example, the state acquisition portion 6 may acquire the state of whether or not there is a nearby occupant within a predetermined distance from the display 1 in the unfolded state, and when such an occupant is present, the driver 4 may be controlled to bring the display 1 into the housed state. Alternatively, the display devices 10 and 10A may not perform control of the driver 4 for bringing the display 1 into the housed state in accordance with the state of the vehicle acquired by the state acquisition portion 6.

Further, although the second embodiment described above decides whether to execute a protection control function for protecting the display 1 from wind pressure or not (executes steps S201 and S202) and then decides whether to execute a protection control function for protecting the display 1 from high heat or not (executes step S204), the disclosure is not limited thereto. For example, decision processing for the protection control function for protecting the display 1 from wind pressure may be performed after decision processing for the protection control function for protecting the display 1 from high heat is performed.

The disclosure is not limited by the first to sixth embodiments described above. Also a configuration in which the components described above are appropriately combined is included in the disclosure. Further, all other embodiments, examples, application techniques, etc. made by those skilled in the art on the basis of the first to sixth embodiments described above are included in the scope of the disclosure.

As above, a display device according to the disclosure is useful for a display device to be mounted in a vehicle, and is particularly suitable for a display device capable of making the mounting space required in a vehicle smaller.

By a display device according to the disclosure, an effect of capability of making smaller a mounting space required in a vehicle is obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device provided inside a vehicle, the display device comprising:
a display having flexibility and a sheet shape;
a movement mechanism that includes a connection connected to a first end portion of the display and in which the connection moves in a direction intersecting a front-rear direction of the vehicle; and
a guide mechanism configured to guide a second end portion of the display in a guide direction different from a movement direction of the connection in association with movement of the connection while curving and supporting a part of the display.

2. The display device according to claim 1, wherein the display includes a curved portion that is located between two virtual planes that, in a state where the display is most extended within a movable range in the guide direction, pass through both ends of the movement mechanism in a direction orthogonal to the front-rear direction and are parallel to the front-rear direction.

3. The display device according to claim 2, wherein the guide mechanism is located between the two virtual planes.

4. The display device according to claim 1, wherein the guide direction is parallel to the front-rear direction.

5. The display device according to claim 1, wherein the movement mechanism further includes:
a fixed portion fixed to the vehicle; and
a link configured to couple the fixed portion and the connection and move the connection relative to the fixed portion.

6. The display device according to claim 1, comprising:
a biasing portion that is connected to the guide mechanism, the biasing portion being configured to give a bias in a direction in which the display extends along the guide direction.

7. The display device according to claim 1, wherein the guide mechanism includes:
a support configured to support a curved portion of the display; and
an other-end connection connected to the second end portion of the display.

8. The display device according to claim 1, further comprising:
a driver configured to drive the movement mechanism or the guide mechanism.

9. The display device according to claim 8, further comprising:
a controller configured to control the driver so that an amount of unfolding of the display to be unfolded in the movement direction in association with movement of the connection is adjusted in accordance with a type of object-to-be-displayed information to be displayed by the display.

10. The display device according to claim 9, wherein the controller is configured to
control the driver such that when the object-to-be-displayed information is a first type of information to be displayed on an entire display surface of the display, a display surface of the display is fully unfolded in the movement direction, and
control the driver such that when the object-to-be-displayed information is a second type of information having a smaller display area than the first type of information, a display surface of the display is partially unfolded in the movement direction in accordance with the display area of the second type of information.

11. The display device according to claim 8, further comprising:
a controller configured to control the driver such that when a traveling speed of the vehicle is equal to or more than a standard speed and a window of the vehicle is in an open state, the display enters a state of being most extended within a movable range in the guide direction.

12. The display device according to claim 8, further comprising:
a temperature detector configured to detect a temperature of the display; and
a controller configured to control the driver such that when a detected temperature of the display is equal to or more than a standard temperature, the display enters a state of being unfolded in the movement direction.

* * * * *